United States Patent
Zheng

(10) Patent No.: US 8,660,430 B2
(45) Date of Patent: Feb. 25, 2014

(54) METHOD AND A SYSTEM FOR OPTIMIZING RADIO NETWORK LAYER TO IMPLEMENT THE NETWORK INTERCONNECTION, AND A METHOD FOR INTERCONNECTION BETWEEN THE RADIO NETWORK AND THE WIRED NETWORK

(75) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1167 days.

(21) Appl. No.: 12/163,223

(22) Filed: Jun. 27, 2008

(65) Prior Publication Data

US 2008/0260389 A1 Oct. 23, 2008

Related U.S. Application Data

(63) Continuation of application No. PCT/CN2006/003726, filed on Dec. 30, 2006.

(30) Foreign Application Priority Data

Dec. 31, 2005 (CN) .......................... 2006 1 0032613
Dec. 31, 2005 (CN) .......................... 2006 1 0032614
Jan. 18, 2006 (CN) .......................... 2006 1 0001622

(51) Int. Cl.
*H04B 10/00* (2013.01)
*H04J 14/00* (2006.01)

(52) U.S. Cl.
USPC .......................................... 398/115; 398/66

(58) Field of Classification Search
USPC .................................. 398/115, 66
See application file for complete search history.

(56) References Cited

U.S. PATENT DOCUMENTS

| 6,597,912 B1 | 7/2003 | Lu et al. |
| 7,107,055 B2 | 9/2006 | Gallagher et al. |
| 7,127,250 B2 | 10/2006 | Gallagher et al. |

(Continued)

FOREIGN PATENT DOCUMENTS

| CN | 1455532 A | 11/2003 |
| CN | 1706208 A | 12/2005 |

(Continued)

OTHER PUBLICATIONS

First Chinese Office Action regarding Application No. 200680001206.X, mailed Aug. 29, 2006. Partial translation provided by Huawei Technologies Co., Ltd.

(Continued)

*Primary Examiner* — Nathan Curs
(74) *Attorney, Agent, or Firm* — Slater & Matsil, L.L.P.

(57) ABSTRACT

A method for optimizing a radio network layer to implement a network interconnection is provided. A radio network controller is divided into radio access network servers and wireless adapters configured in a base station. The wireless adapters are adapted to process related radio interface protocols, and are connected to an optical access network via an adaptation function. The radio access network servers and a core network are respectively connected to optical network units to implement the interconnection between an optical network and a radio communication network. Therefore, the single-point failure is effectively prevented, the flexibility and extensibility are improved, it is convenient for networking, and the network coverage is enlarged. It is suitable for the service development and radio access applications in the future, and facilitates the combination with the wired network.

6 Claims, 20 Drawing Sheets

(56) References Cited

U.S. PATENT DOCUMENTS

| | | |
|---|---|---|
| 2002/0191553 A1 | 12/2002 | Lehr et al. |
| 2003/0020991 A1* | 1/2003 | Chang ........................ 359/168 |
| 2003/0032451 A1 | 2/2003 | Hu |
| 2004/0116120 A1 | 6/2004 | Gallagher et al. |
| 2004/0160905 A1 | 8/2004 | Bernier et al. |
| 2005/0101329 A1 | 5/2005 | Gallagher |
| 2006/0009201 A1 | 1/2006 | Gallagher et al. |
| 2006/0009202 A1 | 1/2006 | Gallagher et al. |
| 2006/0019656 A1 | 1/2006 | Gallagher et al. |
| 2006/0019657 A1 | 1/2006 | Gallagher et al. |
| 2006/0019658 A1 | 1/2006 | Gallagher et al. |
| 2006/0025143 A1 | 2/2006 | Gallagher et al. |
| 2006/0025144 A1 | 2/2006 | Gallagher et al. |
| 2006/0025145 A1 | 2/2006 | Gallagher et al. |
| 2006/0025146 A1 | 2/2006 | Gallagher et al. |
| 2006/0025147 A1 | 2/2006 | Gallagher et al. |
| 2006/0171486 A1* | 8/2006 | Tan .............................. 375/296 |
| 2011/0007705 A1* | 1/2011 | Buddhikot et al. ........... 370/331 |
| 2011/0167490 A1* | 7/2011 | Yung et al. ...................... 726/22 |

FOREIGN PATENT DOCUMENTS

| | | |
|---|---|---|
| CN | 1996914 A | 7/2007 |
| CN | 101005321 A | 7/2007 |
| CN | 1996914 B | 12/2010 |
| EP | 1956762 A1 | 8/2008 |
| EP | 1968250 A1 | 9/2008 |
| GB | 2410861 | 8/2005 |
| KR | 20040050413 | 6/2004 |
| KR | 20040077250 A | 9/2004 |
| WO | 2004036770 | 4/2004 |

OTHER PUBLICATIONS

Extended European Search Report regarding Application No. 11153330.3-1249/2309679, dated May 10, 2011.

3GPP TSG-RAN2 Meeting #49, Seoul, South Korea, Nov. 7-11, 2005. Agenda Item: 5 and 6 (Joint RAN2-RAN3 session). Source: Qualcomm Europe. Title: Qualcomm proposal for E-UTRAN Architecture and Protocols. Document for: Discussion and decision.

ETSI TR 123 873 V4.0.0 (Mar. 2001). Technical Report. Universal Mobile Telecommunications System (UMTS); Feasibility study for transport and control separation in the PS CN domain (3GPP TR 23.873 version 4.0.0 Release 4).

Joint 3GPP TSG SA WG2/TSG RAN WG3. Jun. 28-30, 2005. Montreal, Canada. Source: NTT DoCoMo. Title: Refining the Architecture. Document for: Discussion. Agenda Item: 2.2. Work Item/Release: 3GPP system architecture evolution.

First Chinese Office Action regarding Application No. 200610032614.3, mailed Mar. 7, 2008. Partial translation provided by Huawei Technologies Co., Ltd.

European Office Action regarding Application No. 10 173 687.4-1249, dated Jun. 30, 2011.

European Office Action regarding Application No. 06 840 756.8, dated Sep. 24, 2010.

Extended European Search Report regarding Application No. 10173687.4, dated Sep. 28, 2010.

Elfeitori and Alnuweiri. Network Architecture and medium access control for deploying third generation (3G) wireless systems over CATV networks. Wireless Communications and Mobile Computing 2005; 5: 139-152. Aug. 23, 2004.

Draft 3GPP TR 25.897 V0.3.1 (Aug. 2003). 3rd Generation Partnership Project; Technical Specification Group Radio Access Network; Feasibility Study on the Evolution of UTRAN Architecture; (Release 6).

Written Opinion of the International Searching Authority regarding Application No. PCT/CN2006/003726, mailed Apr. 2, 2007. Translation provided by Huawei Technologies Co., Ltd.

Supplementary European Search Report regarding Application No. EP 06840756 dated Oct. 6, 2009.

Future Access Networks (FAN), IP Based Access Technologies and QoS, Erik Weis, T-Nova Systems GmbH, May 2003.

Network Architecture and Medium Access Control for Deploying Third Generation (3G) Wireless Systems Over CATV Networks, Anwar A. Elfeitori and Hussein Alnuweiri, Wireless Communications and Mobile Computing, Published online Aug. 23, 2004.

3rd Generation Partnership Project; Technical Specification Group Radio Access Network; Feasibility Study on the Evolution of UTRAN Architecture; (Release 6), Draft 3GPP TR 25.897 VO.3.1 (Aug. 2003).

International Search Report for International Application No. PCT/CN2006/003726, dated Mar. 28, 2007, with English translation.

European Office Action regarding Application No. 11 153 330.3-1249, dated Dec. 19, 2011.

Eurescom Project Report. Future Access Networks (FAN). IP based access technologies and QoS. Editor: Erik Weis, T-Nova Systems GmbH. May 2003.

European Patent Office Invitation pursuant to Article 94(3) and Rule 71(1) EPC, European Application No. 11 153 330.3-1249, mailed Sep. 24, 2012, 10 pages.

European Office Action regarding Application No. 10 173 687.4-1249, dated May 8, 2012.

Study on a Novel Architecture Technology for Optical Internet, vol. 32 No. 12A, Dec. 2004, (School of Telecommunication Engineering, Beijing University of Posts and Telecommunications, Beijing 100876, China), translation provided by Huawei Technologies Co., Ltd.

First Office Action of the State Intellectual Property Office of the PRC, translation provided by Huawei Technologies Co., Ltd., Mar. 2008.

* cited by examiner (a)

(b)

(c)

(a)

(b)

(c)

METHOD AND A SYSTEM FOR OPTIMIZING RADIO NETWORK LAYER TO IMPLEMENT THE NETWORK INTERCONNECTION, AND A METHOD FOR INTERCONNECTION BETWEEN THE RADIO NETWORK AND THE WIRED NETWORK

CROSS-REFERENCE TO RELATED APPLICATIONS

This application is a continuation of International Application No. PCT/CN2006/003726, filed Dec. 30, 2006. This application claims the benefit of Chinese Application No. 200610032613.9, filed Dec. 31, 2005; Chinese Application No. 200610032614.3, filed Dec. 31, 2005; and Chinese Application No. 200610001622.1, filed Jan. 18, 2006. The disclosures of the above applications are incorporated herein by reference.

FIELD

The present disclosure relates to the field of communication technology, in particular, to a method and a system for optimizing a radio network layer to implement network interconnection, and a method for interconnection between a radio network and a wired network.

BACKGROUND

The statements in this section merely provide background information related to the present disclosure and may not constitute prior art.

In the prior art, the optical access network (collectively referred to as FTTx) is classified into Fiber To The Home (FTTH), Fiber To The Building (FTTB), Fiber To The Curb (FTTC) and the like, according to the location of the optical network unit (ONU).

The formal name of the optical access network (OAN) is fiber in the loop (FITL). Due to the high bandwidth, the OAN is capable of developing Triple Play in a better way, i.e., a service for simultaneously transmitting voices, data, and multimedia videos. The OAN mainly employs a passive optical network (PON) technology. As an emerging broadband access technology for covering the last mile, the PON does not need node equipments in an ODN, but only needs a simple optical splitter, which thus has advantages of saving fiber resources, high equipment security, high networking speed, and easy maintenance. In the buildings having subscribed the FTTH service, transmission resources can be conveniently obtained. Moreover, thanks to the high broadband property, the FTTH has become an effective supplementary means for 3G IP transmission base stations.

Currently, there are mainly two mainstream technologies that are relatively mature, namely, Ethernet passive optical network (EPON) and Gigabit passive optical network (GPON). A main network architecture of an FTTx network is shown in FIG. 1, which shows a network architecture of the OAN, and the specific OAN reference architecture is shown in FIG. 2.

The OAN is formed by a customer premises network (CPN), an access network, and a service node function (SNF). The main network elements of the CPN and the access network include: an optical line terminal (OLT), an optical distribution network (ODN), an optical network unit/optical network terminal (ONU/ONT), and an adaptation function (AF). In the access network, the AF is an optional device, which mainly provides a conversion between an ONU/ONT interface and a user network interface (UNI). The AF may also be built in the ONU, and in this case, a reference point a can be omitted. The AF may also be arranged behind the OLT to provide a conversion between an OLT interface and a service node interface (SNI). The AF may either be considered as a function of the CPN or a function of the access network, in which T is a reference point for the UNI interface, and V is a reference point for the SNI interface. The OLT provides a network interface for the ODN and is connected to one or more ODNs. The ODN provides a transmission means for the OLT and the ONU. The ONU provides a user side interface for the OAN and is connected to the ODN.

A customer premises equipment (CPE) is connected to the AF via the UNI interface (for example, a DSL line). Next, the AF converts a packet format from a format of the UNI interface into a format of an interface a (for example, an Ethernet link) capable of being connected to the ONU. Then, the ONU converts the packet into a format capable of being delivered on the ODN (for example, EPON encapsulation, or GPON encapsulation based on generic framing). Finally, the OLT converts the packet into a packet format of the SNI interface (for example, Ethernet link), and then accesses a service node.

The 3G/2G radio communication system employs a similar structure, which includes a radio access network (RAN) and a core network (CN). The RAN is adapted to process all the radio related functions, whereas the CN processes all the voice calls and data connections within the radio communication system, and implements the switching and routing functions with an external network. The CN is logically divided into a circuit switched (CS) domain and a packet switched (PS) domain. The RAN and the CN, together with a mobile station (MS), constitute the entire 3G/2G radio communication network, and the system reference architecture thereof is shown in FIG. 3.

A base station (BS) is called a base transceiver station (BTS) in GSM/GPRS/CDMA/CDMA2000, and it is called a Node B in WCDMA/TD-SCDMA. A base station controller (BSC) is called a radio network controller (RNC) in WCDMA. In CDMA2000, a packet control function (PCF) is located between the BSC and a packet data serving node (PDSN) and supports packet data services. As a part of the RAN, the PCF may be allocated together with the BSC or separately.

As for WCDMA, the UTRAN uses the Iu serial interfaces, which includes Iu, Iur, and Iub interfaces. Among such interfaces, the protocol stacks are classified into a corresponding radio network layer (RNL) and a transport network layer (TNL) according to the general protocol model at the UTRAN interface. The Iu interface is an interface for connecting the UTRAN to the CN, which is an open standard interface with the RANAP as the control plane protocol and the GTP protocol as the user plane protocol. The Iur interface is an interface for connecting one RNC with another, which is an exclusive interface for the UMTS system, and is adapted to mobile management of the MS in the RAN. For example, if a soft handover is performed between different RNCs, all data of the MS is transmitted from the RNC in operation to candidate RNCs via the Iur interface. The Iur interface is also an open standard interface with the RNSAP as the control plane protocol and the Iur FP as the user plane protocol. The Iub interface is an interface for connecting the Node B to the RNC, which is also an open standard interface, and takes the NBAP as the control plane protocol and the Iub FP as the user plane protocol.

The Node B is a BS (i.e., a radio transceiver) for the WCDMA system, and includes a radio transceiver and a base band processing unit. The Node B is interconnected with the RNC via the standard Iub interface and mainly adapted to complete the processing of the physical layer protocol at the Uu interface. The main functions of the Node B mainly lie in spreading, modulating, channel coding, despreading, demodulating, and channel decoding, as well as interconversion between the base band signal and the radio frequency (RF) signal.

The RNC is adapted to control the radio resources of the UTRAN and has the main functions of connection establishment, disconnection, handover, macro diversity combination, radio resource management and control. Particularly, the RNC includes the following functions: (1) the broadcast distribution and system access control; (2) the mobility management, such as handover and RNC relocation; and (3) the radio resource management and control, such as macro diversity combination, power control, and radio bearer distribution.

The radio interface protocol stack architecture between a user equipment (UE) and the UTRAN includes a plurality of protocols distributed and implemented in different nodes in the RAN. As shown in FIG. 4, a radio resource control (RRC) protocol is implemented in the UE and RNC, and mainly adapted to implement the RRC connection management, radio bearer management, paging/broadcasting, mobility management, and other functions. The RRC protocol is responsible for configuring parameter information of the other protocol entities in the radio interface protocol stack. A radio link control (RLC) protocol is implemented in the UE and the RNC, and mainly adapted to implement the data transmission function of user data and provides three data transmission modes respectively suitable for transmitting service data with different QoS requirements. A media access control (MAC) protocol is generally implemented in the UE and RNC and responsible for selecting suitable transmission formats for the user data and realizing the mapping from logical channels to transport channels. As for some special types of channels, the Node B supports the MAC protocol. A packet data convergence protocol (PDCP) is implemented in the UE and RNC and has the following functions. The PDCP protocol respectively performs header compression and decompression of the IP data stream in the transmitting and receiving entities, for example, the TCP/IP and RTP/UDP/IP header compression manners are corresponding to particular combinations of network layers, transport layers, or upper layer protocols. The PDCP protocol further has the function of user data transmission, that is, forwarding the PDCP-SDU from the non-access stratum to the RLC layer, in which if the lossless SRNS relocation function is supported, the PDCP-SDU and the corresponding serial number are forwarded, so as to multiplex a plurality of different RBs into the same RLC entity.

A broadcast/multicast control protocol (BMC) has the functions of storing broadcast messages of the cell, monitoring the traffic flow and requesting radio resources for a cell broadcast service (CBS), scheduling BMC messages, sending the BMC messages to the UE, transmitting the cell broadcast messages to a high layer (the NAS).

In the current protocol stacks, since the Node B merely processes the physical layer protocols, all self-adaptive technologies that are determined through using the resource management are required to be implemented in the RNC, and two stages are required from the network to the terminal, that is, from the RNC to the Node B, and from the Node B to the terminal, and vice versa. As a result, a long delay is generated at the Iub interface, and the processing capacity of the Node B and the statistical-multiplexing rate of the transmission resources at the Iub interface are both reduced. Due to the long delay at the Iub interface, the throughput of the retransmission mechanism of the RLC layer between the RNC and the UE is lowered. What's worse, due to the long delay at the Iub interface, the outer loop power control algorithm cannot rapidly adjust the SiRtarget according to changes of the airlink. Meanwhile, the cell load information relies on the periodical report from the Node B, so that the information hysteresis exists, and as a result, the load information obtained by the RNC is not in real time.

Therefore, the protocol structure with all the access high layers being allocated in the RNC is not suitable for high-speed data transmission, since such a protocol structure cannot guarantee high speed and high efficiency of the data transmission upon adopting the technologies similar to self-adaptive coordination and feedback control. Thus, it is difficult to meet the requirements of the high-speed data transmission.

A hybrid fiber-coaxial (HFC) access network (DOCSIS) is a bidirectional interactive broadband network based on the cable television coaxial network, which reserves the traditional analogue transmission mode and also makes full use of the current cable television coaxial cable resources, for providing various services for users such as phone calls, broadcasting and television, video on demand, Internet access, videoconference, and data, without allocating new distribution networks. Therefore, the DOCSIS possesses low cost, wideband, and multi-service properties, which will become a desirable solution for the last mile broadband access. The DOCSIS is a CableLabs standard for the bidirectional interactive HFC access network, and the PacketCable standard is a DOCSIS-based multi-service operator (MSO) broadband standard.

The PacketCable is divided into an HFC access network, a CPN, and a managed IP network, and the PacketCable reference architecture based on the HFC access network as shown in FIG. 5. The main network elements of the HFC access network and the CPN include: a cable modem terminal system (CMTS), an HFC transport network (HFC/Cable Network), a cable modem (CM), a multimedia terminal adapter (MTA) (omitted in the figure) and the like. The CMCI is a reference point for the CPE and the CM in the CPN; the CMRFI is a reference point between the CM and the HFC/Cable Network; and the CMTS-NSI is an Ethernet aggregation reference point between the CMTS and the managed IP network.

The managed IP network and the CPE can employ Layer 2 network bridging technology, and may also employ IP Layer 3 routing technology.

A transmission method for a 2G/3G network BS in the prior art is described as follow.

E1/T1 is taken as the transmission technology of the BS. For example, FIG. 6 is a schematic view of a typical WCDMA networking transmission mode. Referring to FIG. 6, a user leaves the E1 networking via the Iub interface of the WCDMA. The WCDMA provides a maximum bandwidth of merely 2 Mbps for each user. The Iub transmission of WCDMA R99 employs an ATM transmission technology. The ATM can be carried on the TDM transmission, for example, on the E1/T1 (E1 transmission rate is 2 MHz, and T1 transmission rate is 1.5 MHz). Generally, in order to support a great number of users, the BS needs to multilink bundle the E1/T1, i.e., employing an inverse multiplexing over ATM (IMA) technology.

In the prior art described above, when the transmission bandwidth required by the data service is continuously increased, if the operators still employ the E1/T1 transmission mode, the link load between the BS and the BSC is relatively heavy due to the slow transmission rate of the E1/T1 transmission mode, which cannot meet the transmission rate requirement of the high-speed data service, and cannot guarantee the QoS of the high-speed data service. Meanwhile, the low charge of the data service will result in high cost and low returns, thereby severely influencing the operators' profits.

Therefore, the radio network transmission has become an urgent problem to be solved by the operators. The operators are confronted with the selection of either establishing their own transmission networks or seeking other inexpensive alternative technologies.

SUMMARY

In various embodiments, a method for optimizing a radio network layer to implement a network interconnection is provided, which includes the following steps.

A control function and a bearer function of a radio network controller (RNC) are separated into a radio access network server and a wireless adapter.

The wireless adapter is configured in a base station (BS). During communication, the wireless adapter processes related radio interface protocols.

The wireless adapter configured in the BS is connected to an optical access network (OAN) via an adaptation function (AF). The radio access network server and a core network of the radio communication network are respectively connected to corresponding optical network units, so as to implement an interconnection between the optical network and the radio communication network.

In various embodiments, a radio gateway is configured in the radio access network. The method further includes: configuring the radio gateway between the BS and the core network; and/or connecting the radio gateway to the radio access network server.

In various embodiments, a radio resource control, a radio network layer, and a transport network layer of an interface between the wireless adapter and the radio access network server are directly carried on the OAN network.

In various embodiments, a system for optimizing a radio network layer to implement a network interconnection is provided, which includes a radio access network and a corresponding core network, as well as wireless adapters and radio access network servers.

Each wireless adapter is configured in the BS and adapted to process related radio interface protocols. The wireless adapter provides the following functions, including media access control (MAC), radio link control (RLC), packet data convergence protocol (PDCP), cell-specific radio resource management (RRM), and handover control.

The radio access network servers are adapted to provide functions of relocation between wireless adapters and broadcast distribution.

In various embodiments, a method for an interconnection between a BS and a wired network is provided, which includes the following steps.

First, a radio interface protocol stack of a radio network is moved downward to the BS, and the radio interface protocols are processed by the BS.

Then, the BS is connected to the radio network via a passive optical network (PON) or a fiber/coaxial cable hybrid network access network (DOCSIS network), so as to implement radio transmission.

In various embodiments, a system for an interconnection between a BS and a wired network is provided, which includes a BS equipment, and an optical network unit/optical network terminal (ONU/ONT) equipment.

The BS equipment is connected to the ONU/ONT equipment of an OAN network at a reference point a via at least one pair of wired links, and adapted to accomplish radio access processing of a wireless subscriber, perform a base station control processing on data packets or frames of the accessed wireless subscriber and then deliver the processed data packets or frames to the ONU/ONT equipment, and perform the base station control processing on data packets or frames from the ONU/ONT equipment and then output the processed data packets or frames to the wireless subscriber.

The ONU/ONT equipment is respectively connected to the BS equipment and an optical line terminal (OLT) of the OAN, and adapted to convert data packets or frames delivered from the BS equipment into optical signals and then deliver the optical signals to the OLT of the OAN, and convert data packets or frames delivered from the OLT into electrical signals and then deliver the electrical signals to the BS equipment.

In various embodiments, a system for an interconnection between a BS and a wired network is provided, which includes a BS equipment.

The BS equipment, integrated with functions of the ONU/ONT, is connected to an optical distribution network (ODN) and an OLT equipment, and adapted to accomplish radio access processing of a wireless subscriber, process data packets or frames of the accessed wireless subscriber and then deliver the processed data packets or frames to the OLT equipment, and perform a base station control processing on data packets or frames from the OLT equipment and then output the processed data packets or frames to the wireless subscriber.

Preferably, the system further includes a remote power supply equipment.

The remote power supply equipment is adapted to convert a mains input or a DC input into a high-voltage DC to remotely supply power to BS equipments.

In an embodiment, a system for an interconnection between a BS and a wired network is provided, which includes a BS equipment and a cable modem (CM) equipment.

The BS equipment is connected to the CM equipment of a fiber/coaxial cable hybrid network access network (DOCSIS) at a reference point CMCI, and adapted to accomplish radio access processing of a wireless subscriber, perform a base station control processing on data packets or frames of the accessed wireless subscriber and then deliver the processed data packets or frames to the CM equipment, and perform the base station control processing on data packets or frames from the CM equipment and then output the processed data packets or frames to the wireless subscriber.

The CM equipment is connected to the BS equipment and a cable modem terminal system (CMTS) equipment of the DOCSIS network, and adapted to perform a DOCSIS modulation on data packets or frames from the BS equipment and then deliver the modulated data packets or frames to the CMTS equipment, and perform a DOCSIS demodulation on data packets or frames from the CMTS equipment and then deliver the demodulated data packets or frames to the BS equipment.

In an embodiment, a system for an interconnection between a BS and a wired network is provided, which includes a BS equipment and a CMTS equipment.

The BS equipment is connected to the CMTS equipment of a DOCSIS network at a reference point CMRFI, and adapted to accomplish radio access processing of a wireless subscriber, perform a base station control processing on data packets or frames of the accessed wireless subscriber and then deliver the processed data packets or frames to the CMTS equipment, and perform the base station control processing on data packets or frames from the CMTS equipment and then output the processed data packets or frames to the wireless subscriber.

The CMTS equipment is respectively connected to the BS equipment and a managed IP network, and adapted to perform a DOCSIS demodulation on data packets or frames from the BS equipment and then deliver the demodulated data packets or frames to the managed IP network, and perform a DOCSIS modulation on data packets or frames from the managed IP network and then deliver the modulated data packets or frames to the BS equipment.

To sum up, in various embodiments, directed to the issue of realizing interconnections between 3G/2G radio communication networks and an OAN network (for example, network accessed by the PON technology), a solution of moving a radio interface protocol stack of a radio network downward to a BS and then tightly or loosely coupled to the OAN network is provided as a wireless extension of the wired access of the OAN network, which is suitable for fixed, nomadic, portable, and mobile access applications, thereby providing an evolution approach for the OAN network operators to develop the radio network. Therefore, the standard Iu/Iur interfaces can be reused to the maximum extent, which enables a smooth evolution of the existing UTRAN architecture. The downward movement of the airlink protocol stack reduces the influences on the QoS of the subscriber caused by transmission delay, and thus ensuring the QoS of the high-speed data service. The link load between the BS and the BSC is greatly reduced, since the configuration of the messages of the radio interface protocol user plane protocol by the radio interface protocol control plane RRC are executed within the BS, and furthermore, the RLC retransmission does not use this link any more, the transmission mechanism between the BS and the BSC is greatly simplified, thereby enhancing the data transmission performance and increasing the utilization rate of the radio access network resources.

The control plane and the user plane are separated in the present disclosure to simplify the design of each entity, optimize functions of the RNC and BS, SGSN and GGSN to make them more applicable for the access network structure with a distributed network structure, ensure a rapid response mechanism between the network and the UE and improved flexibility and scalability, and facilitate the networking, which thus is more suitable for the service development in the future.

The many-to-many network architecture is employed in the present disclosure, which can effectively avoid single-point failure.

The solutions of the present disclosure are particularly suitable for fixed, nomadic, portable, and low-speed mobile radio access applications, and facilitate the convergence with the wired network.

The tight-coupling solution provided in the present disclosure makes complements to characteristics of the wireless/mobile access technology and the OAN access technology and enlarges the network coverage based on the wireless/mobile over fiber. The wireless/mobile over fiber mainly utilizes the wireless coverage feature to complement the OAN coverage, so as to enable the 3G/2G access network to make fully use of the already allocated wire resources of the original OAN network during construction, thereby reducing the construction cost of the 3G/2G access network.

The loose-coupling solution provided in the present disclosure enables the radio network and the OAN to share their core network resources as far as possible, and performs uniform authentication, accounting, and customer care.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

The present disclosure will become more fully understood from the detailed description given herein below for illustration only, and thus is not limitative.

Figure 9:
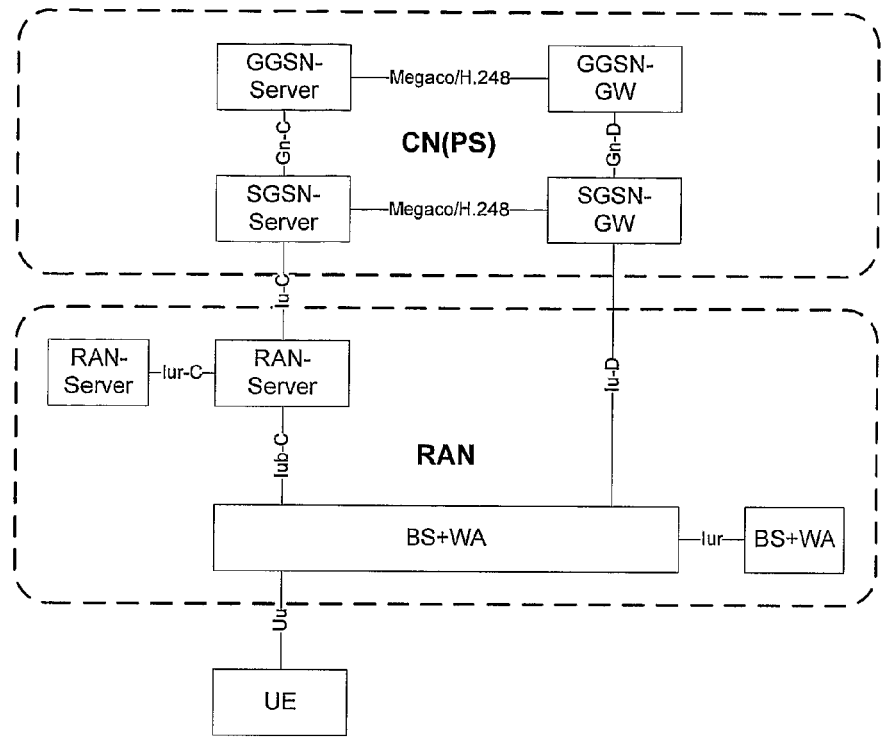
Figure 10:
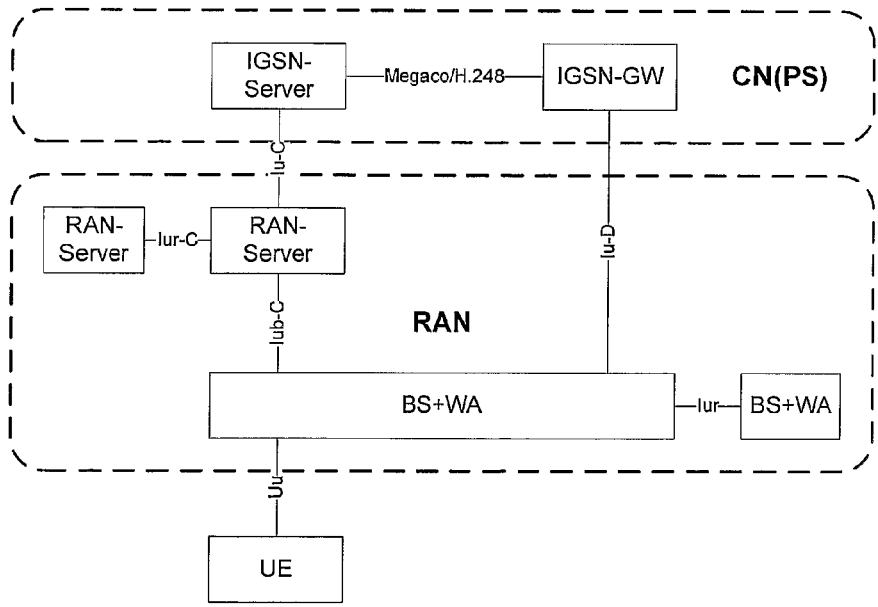
Figure 11:
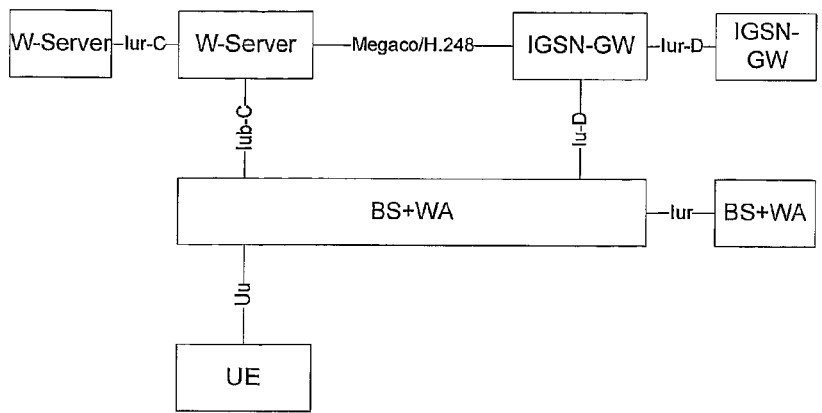
Figure 12:
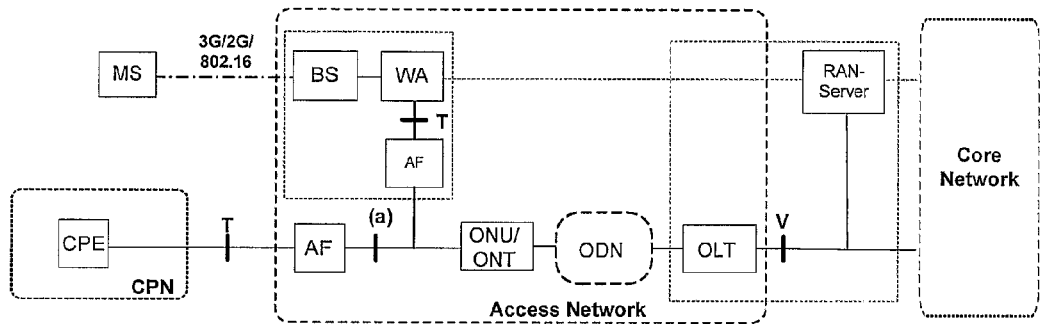
Figure 13:
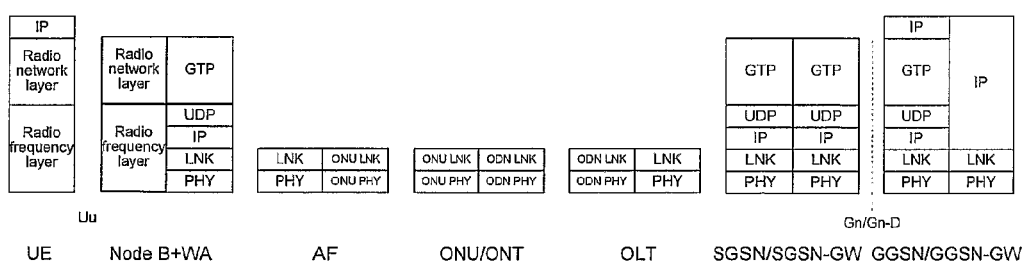
Figure 14:
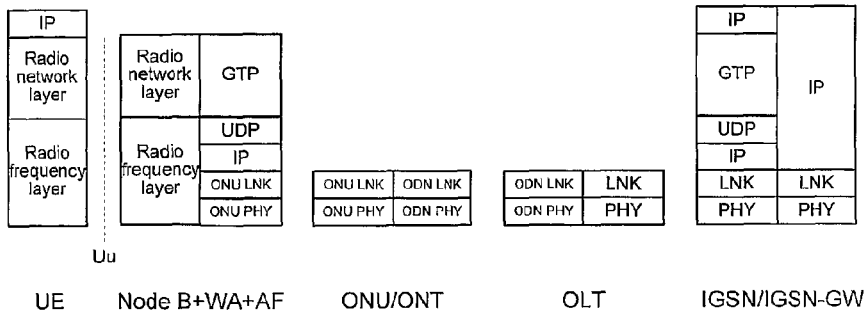
Figure 15:
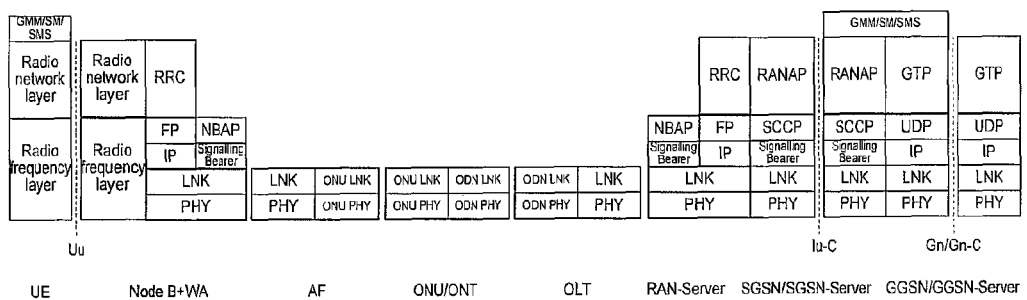
Figure 16:
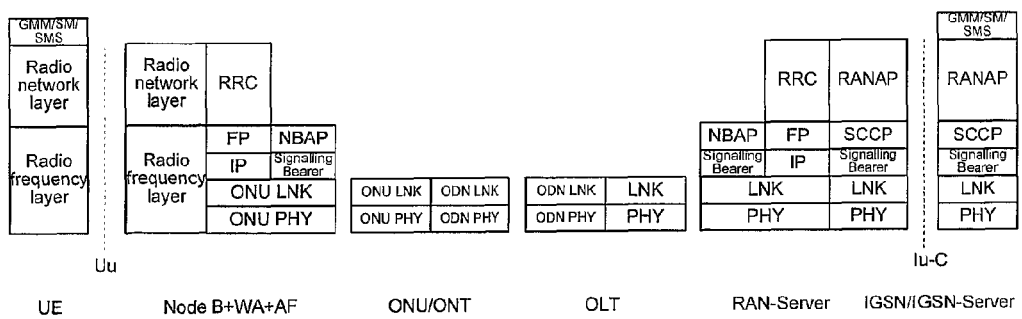
Figure 17:
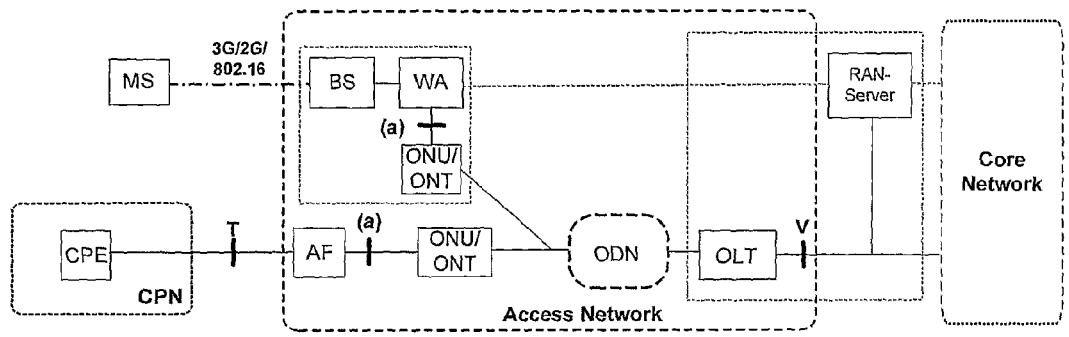
Figure 18:
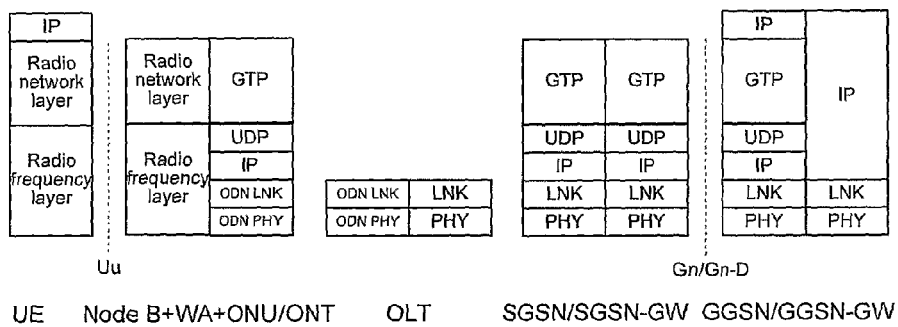
Figure 19:
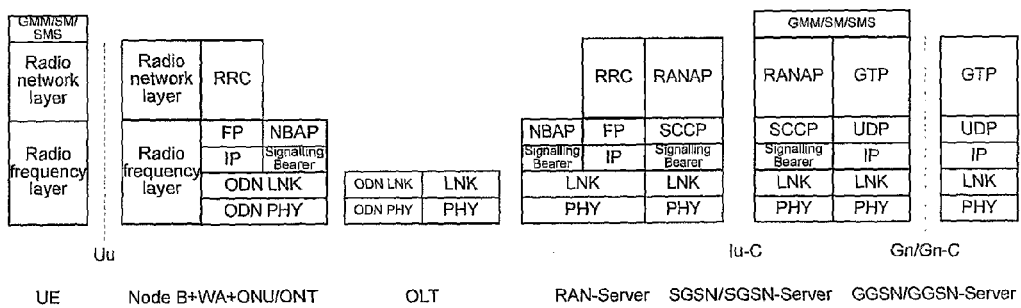
Figure 20:
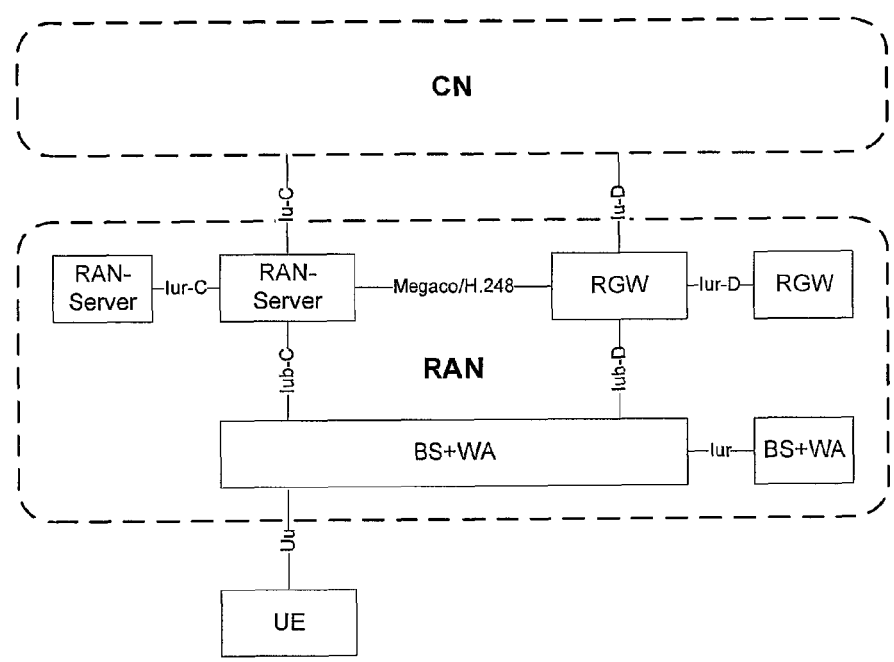
Figure 22:
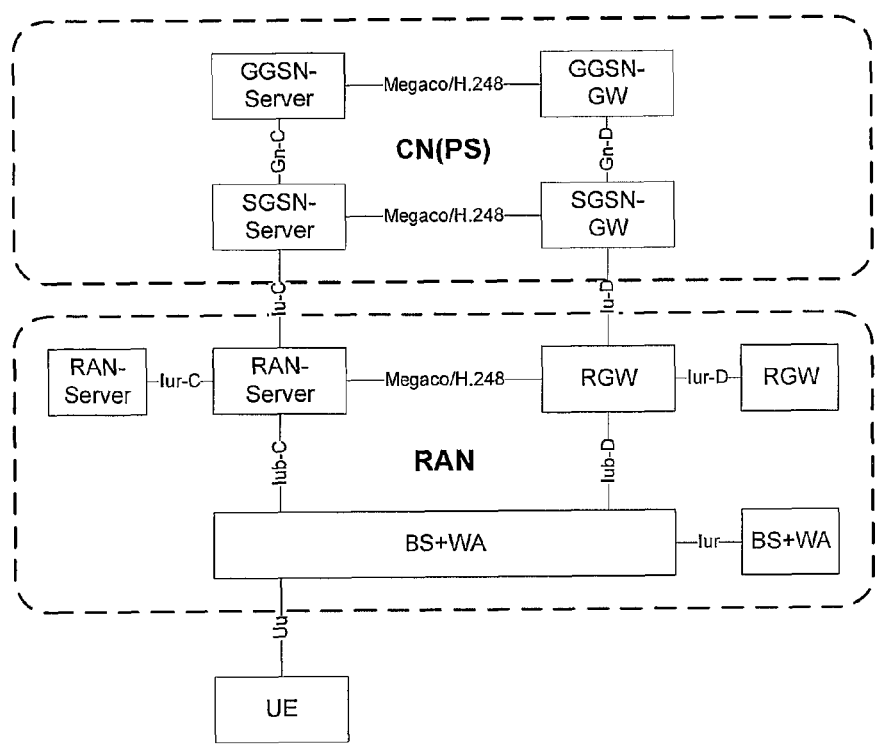
Figure 23:
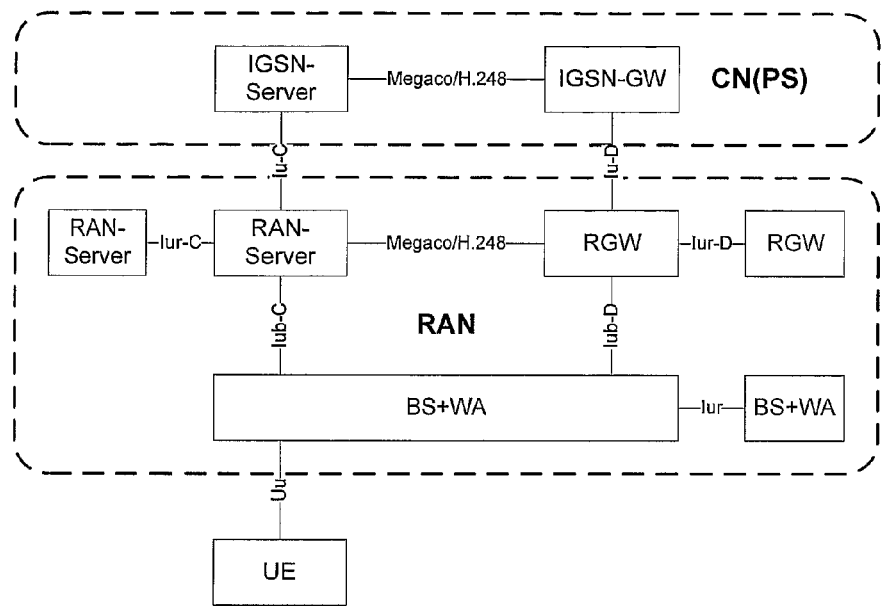
Figure 24:
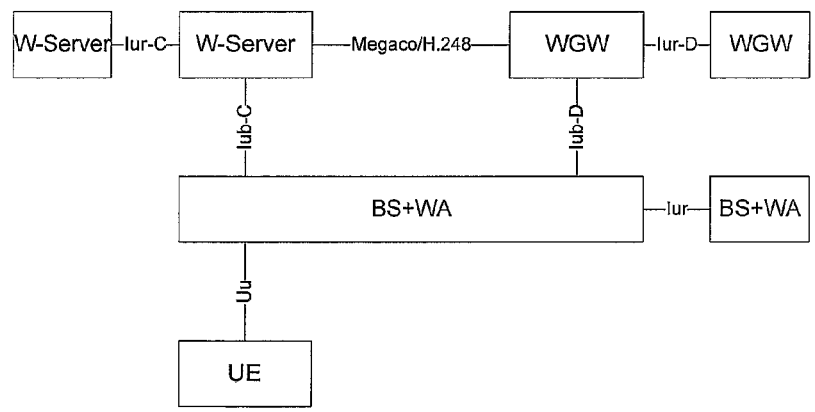
Figure 25:
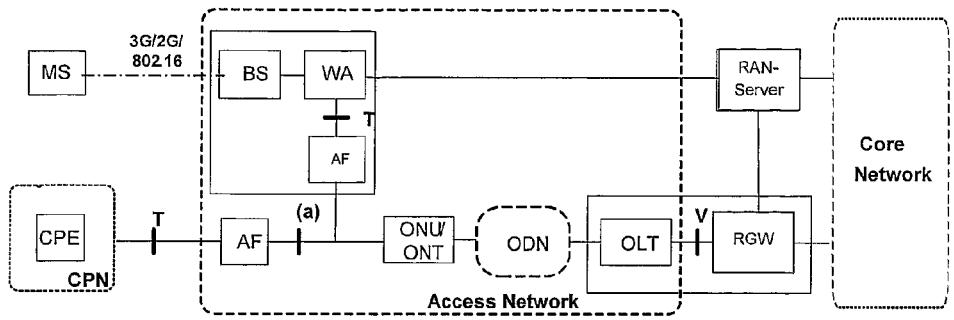
Figure 26:
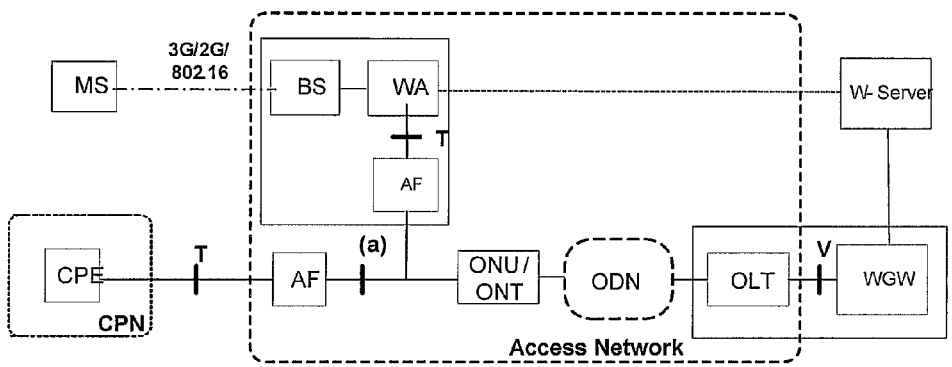
Figure 27:
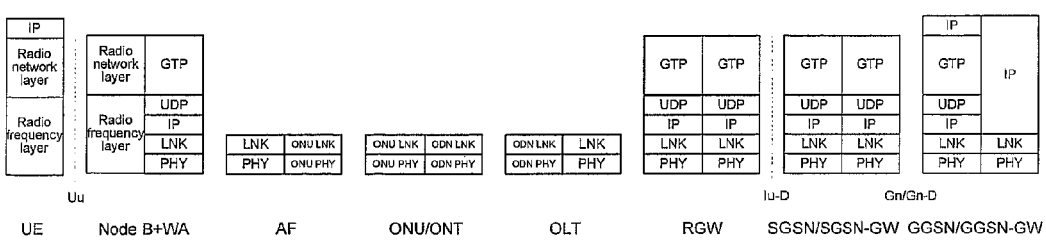
Figure 28:
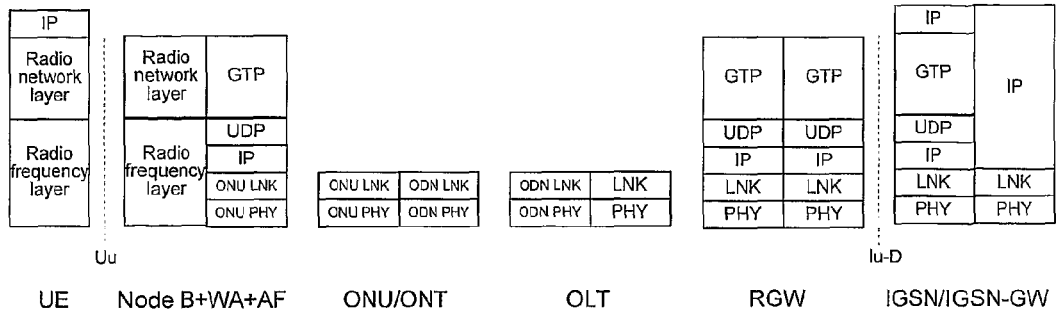
Figure 29:
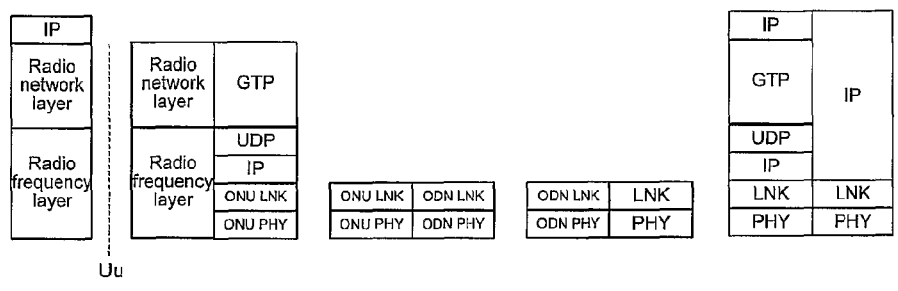
Figure 30:
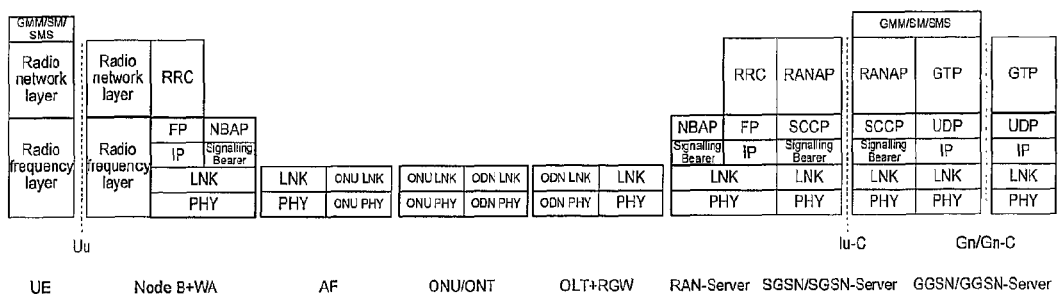
Figure 31:
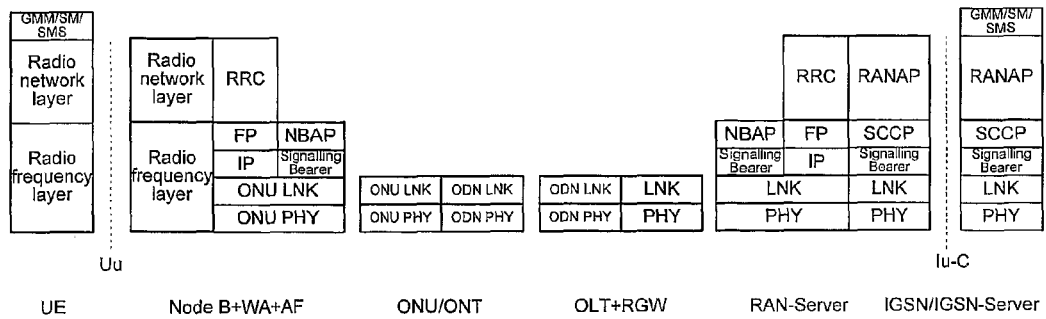
Figure 32:
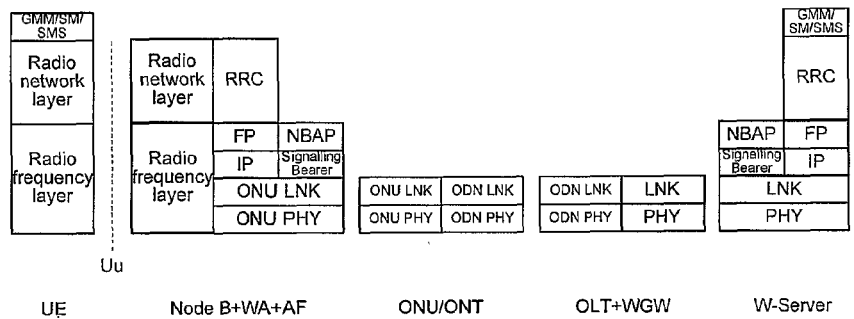
Figure 33:
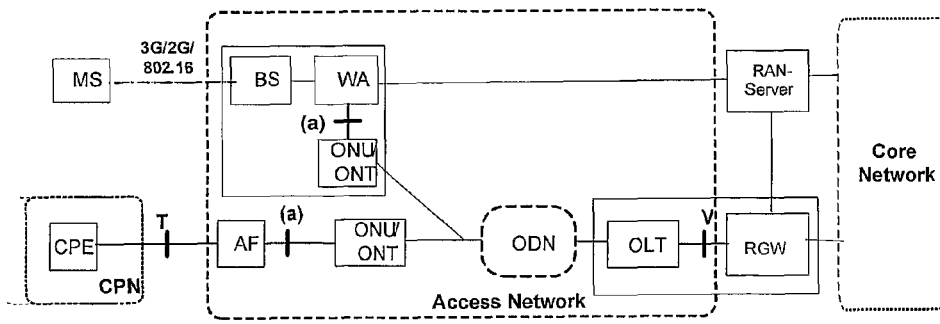
Figure 34:
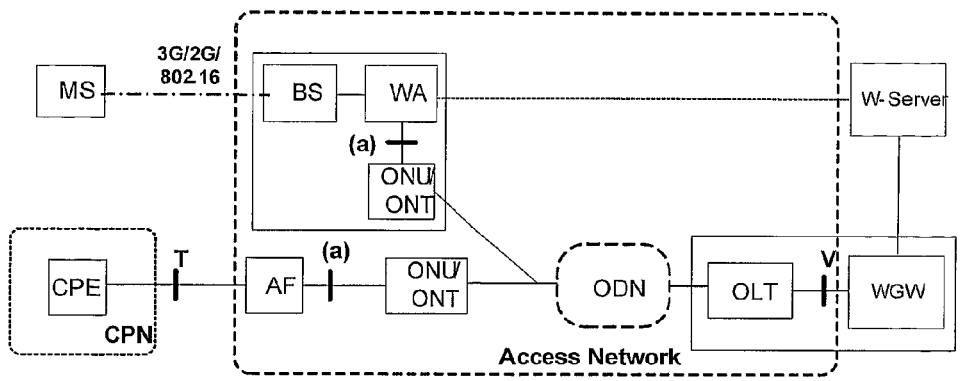
Figure 35:
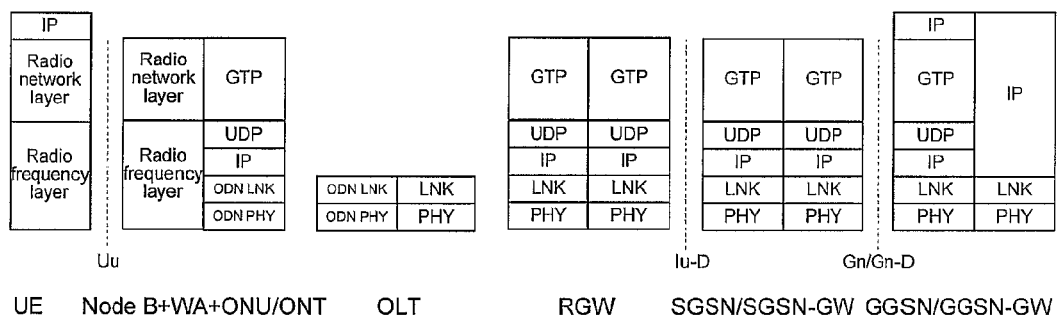
Figure 36:
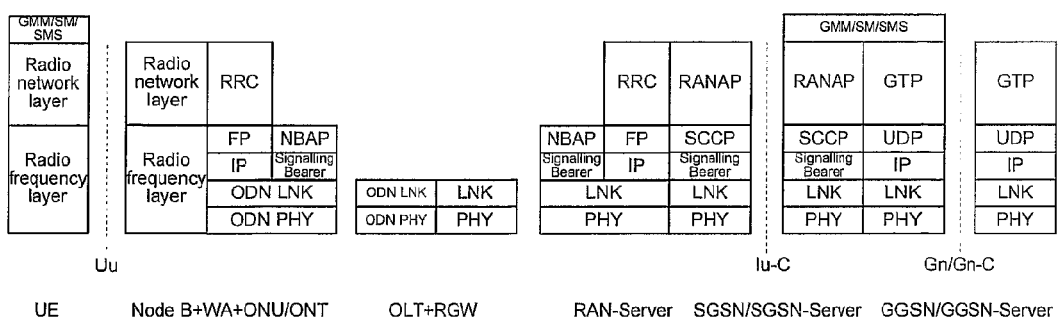
Figure 37:
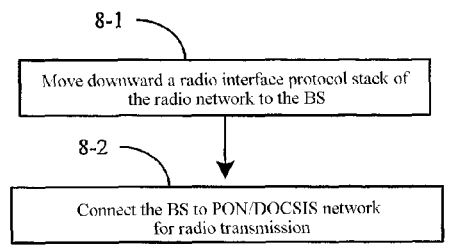
Figure 38:
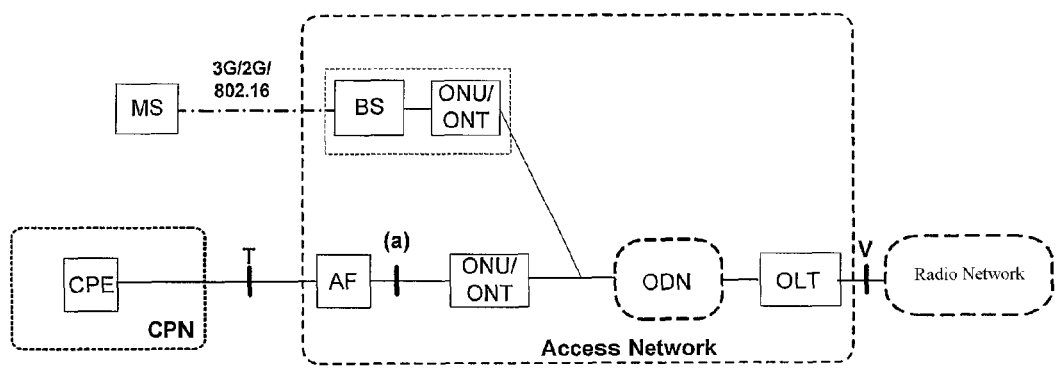
Figure 39:
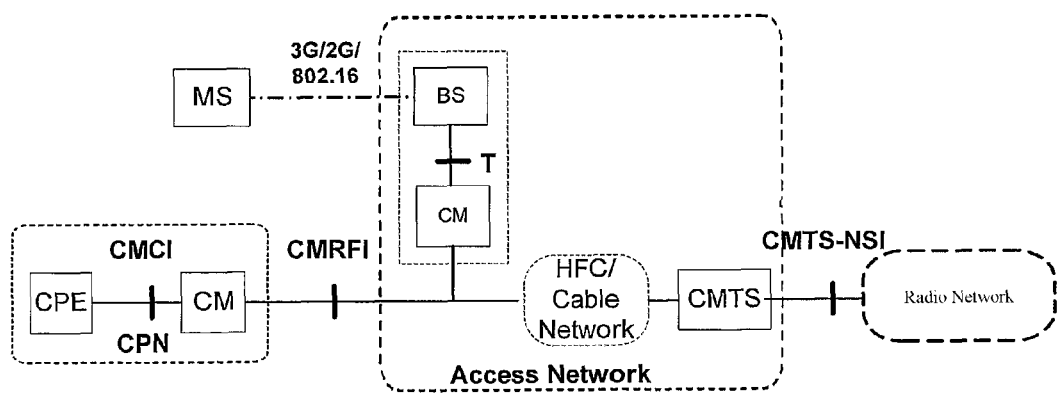
Figure 40:
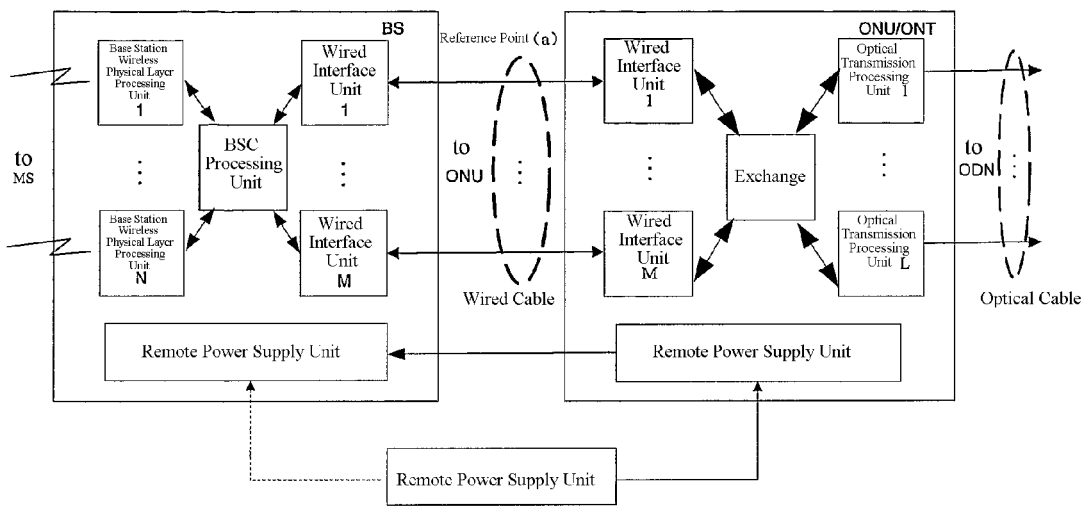
Figure 41:
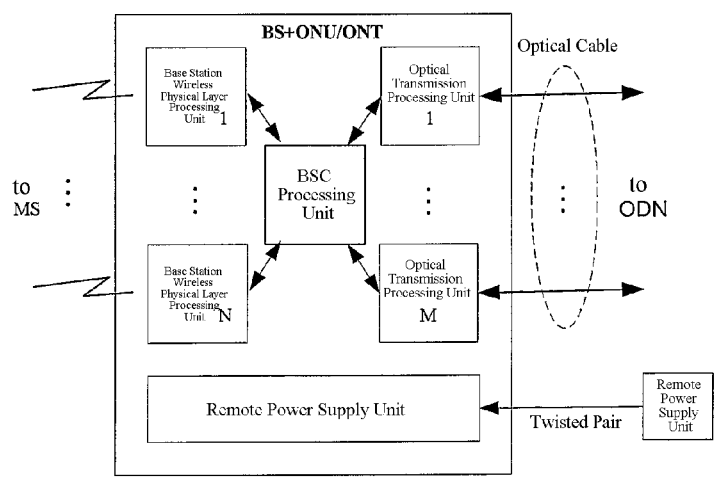
Figure 42:
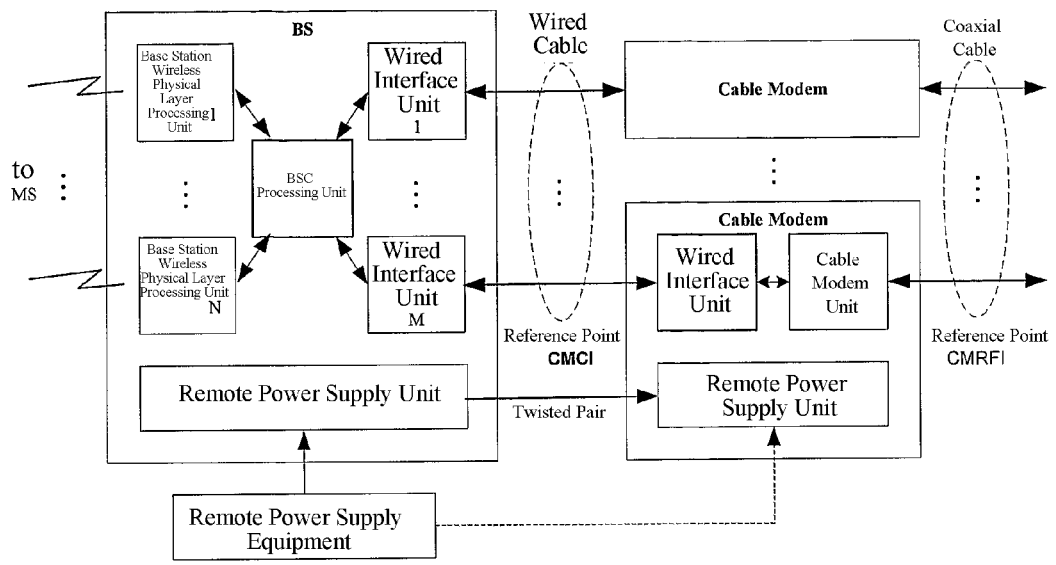
Figure 43:
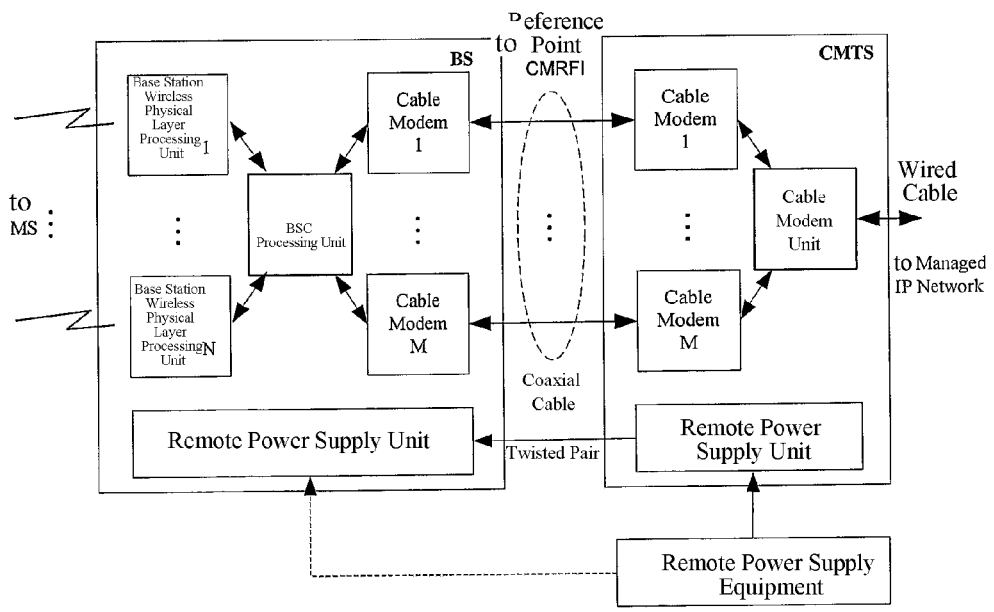

FIGS. 8(a), (b), and (c) are schematic views of an interface protocol stack of an enhanced mobile network with radio interface functions moved downward according to an embodiment; in which FIG. 8(a) is a schematic structural view of a user plane in the enhanced mobile network with radio interface functions moved downward in the system; FIG. 8(b) is a schematic structural view of a control plane in the enhanced mobile network with radio interface functions moved downward in the system; and FIG. 8(c) is a schematic view of IP-based Megaco/H.248 protocol stack in the system;

FIG. 9 is a schematic view of an architecture of an enhanced mobile network with radio interface functions moved downward according to a first embodiment;

FIG. 10 is a schematic view of an architecture of an enhanced mobile network with radio interface functions moved downward according to a second embodiment;

FIG. 11 is a schematic view of a new network architecture according to another embodiment;

FIG. 12 is a schematic structural view of an interconnection between an OAN network and a radio network according to the first embodiment;

FIG. 13 is a schematic view of an integrated network element BS+WA separated from a network element AF on a user plane in a network interconnection solution according to the first embodiment;

FIG. 14 is a schematic view of network elements BS, WA, and AF integrated together on the user plane in the network interconnection solution according to the first embodiment;

FIG. 15 is a schematic view of an integrated network element BS+WA separated from a network element AF on a control plane in a network interconnection solution according to the second embodiment;

FIG. 16 is a schematic view of network elements BS, WA, and AF integrated together on a user plane in the network interconnection solution according to the second embodiment;

FIG. 17 is a schematic view of an interconnection solution between an OAN network and a radio network according to the second embodiment;

FIG. 18 is a schematic view of an architecture of network elements BS, WA, and ONU/ONT integrated together on a user plane in the network interconnection solution according to the second embodiment;

FIG. 19 is a schematic view of an architecture of network elements BS, WA, and ONU/ONT integrated together on a control plane in the network interconnection solution according to the second embodiment;

FIG. 20 is a schematic view of an architecture of an enhanced mobile network according to an embodiment;

FIGS. 21(a), (b), and (c) are schematic views of an interface protocol stack of an enhanced mobile network with radio interface functions moved downward according to the present disclosure; in which FIG. 21(a) is a schematic structural view of a user plane in the enhanced mobile network with radio interface functions moved downward in a system; FIG. 21(b) is a schematic structural view of a control plane in the enhanced mobile network with radio interface functions moved downward in the system; and FIG. 21(c) is a schematic view of IP-based Megaco/H.248 protocol stack in the system;

FIG. 22 is a schematic view of an architecture of an enhanced mobile network with radio interface functions moved downward according to an embodiment;

FIG. 23 is a schematic view of an architecture of an enhanced mobile network with radio interface functions moved downward according to an embodiment;

FIG. 24 is a schematic structural view of an interconnection between an OAN network and a radio network according to an embodiment;

FIG. 25 is a schematic view of an interconnection between an OAN network and a radio network according to an embodiment;

FIG. 26 is a schematic view of an interconnection solution between an OAN network and a radio network according to an embodiment;

FIG. 27 is a schematic view of an integrated network element BS+WA separated from a network element AF on a user plane according to an embodiment;

FIG. 28 is a schematic view of network elements BS, WA, and AF integrated together on a user plane according to an embodiment;

FIG. 29 is a schematic view of network elements BS, WA, and AF integrated together on a user plane according to an embodiment;

FIG. 30 is a schematic view of an integrated network element BS+WA separated from a network element AF, and an OLT integrated with an RGW on a control plane according to an embodiment;

FIG. 31 is a schematic view of network elements BS, WA, and AF integrated together, and an OLT integrated with an RGW on a control plane according to an embodiment;

FIG. 32 is a schematic view of network elements BS, WA, and AF integrated together, and an OLT integrated with a WGW on a control plane according to an embodiment;

FIG. 33 is a schematic view of an interconnection between an OAN network and a radio network according to an embodiment;

FIG. 34 is a schematic view of an interconnection between an OAN network and a radio network according to the present disclosure;

FIG. 35 is a schematic view of an architecture with network elements BS, WA, and ONU/ONT integrated together on a user plane according to an embodiment;

FIG. 36 is a schematic view of network elements BS, WA, and ONU/ONT integrated together, and an RGW integrated with an OLT on a control plane according to an embodiment;

FIG. 37 is a flow chart of a method for an interconnection between a BS and a wired network according to an embodiment;

FIG. 38 is a schematic view of a BS employing a PON transmission according to an embodiment;

FIG. 39 is a schematic view of a BS employing a DOCSIS transmission according to an embodiment;

FIG. 40 is a schematic structural view of a system for an interconnection between a BS and a PON network according to an embodiment;

FIG. 41 is a schematic structural view of a system for an interconnection between a BS and a PON network according to another embodiment;

FIG. 42 is a schematic structural view of a system for an interconnection between a BS and a DOCSIS network according to an embodiment; and FIG. 43 is a schematic structural view of a system for an interconnection between a BS and a DOCSIS network according to another embodiment.

DETAILED DESCRIPTION

The following description is merely exemplary in nature and is not intended to limit the present disclosure, application, or uses.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

Specific embodiments are described below with reference to the accompanying drawings.

In various embodiments, in order to implement a network interconnection through moving downward the radio network layer, the functions of a radio access network (RAN) are separated, and the following functional units are defined, namely, a base station (BS), a wireless adaptor (WA), and a radio access network server (RAN-Server). The functions of the BS, WA, and RAN-Server are classified as follows.

As for an RAN of a WCDMA/GPRS/TD-SCDMA network, the functional decomposition of the BS, WA, and RAN-Server is shown in Table 1, in which the functions of the WA are moved downward to the BS.

TABLE 1

| Functional decomposition of BS, WA, and RAN-Server | | | |
|---|---|---|---|
| Function | BS | WA (with functions moved downward) | RAN-Server |
| Physical Layer (PHY) | Mandatory | | |
| Media Access Control (MAC) | | Mandatory | |

TABLE 1-continued

Functional decomposition of BS, WA, and RAN-Server

| Function | BS | WA (with functions moved downward) | RAN-Server |
|---|---|---|---|
| Radio Link Control (RLC) | | Mandatory | |
| Broadcast/Multicast Control (BMC) | | Optional | Optional |
| Packet Data Convergence Protocol (PDCP) | | Mandatory | |
| Radio Resource Control (RRC) | | | |
| Multi-cell Radio Resource Management (MC-RRM) | | | Optional |
| Cell-specific Radio Resource Management (CS-RRM) | | Mandatory | |
| Broadcast Distribution | | | Mandatory |
| Handover Control (HO Control) | | Mandatory | |
| Paging Control | | | Optional |
| Admission Control | | Optional | |
| Intra-cell Control | | Optional | |
| Inter-cell Control | | | Optional |
| Relocation Control | | | Mandatory |
| QoS Scheduling | | Optional | |
| RANAP Message Forwarding | | | Optional |
| RNSAP Message Forwarding | | | Optional |
| Handover Control between Wired Access and Radio Access | | | Optional |

Figure 7:
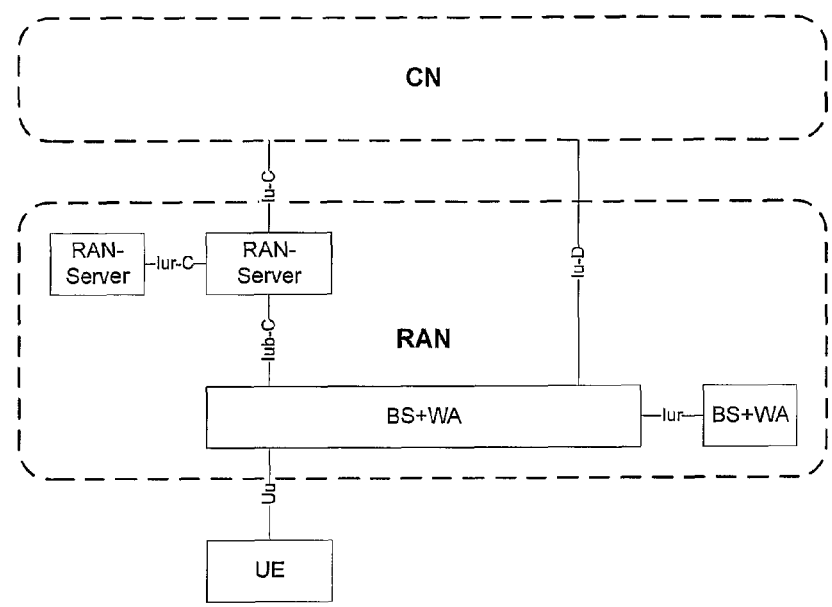
FIG. 7 is a schematic view of an architecture of an enhanced mobile network with radio interface functions moved downward in a system according to various embodiments.
Figure 8:
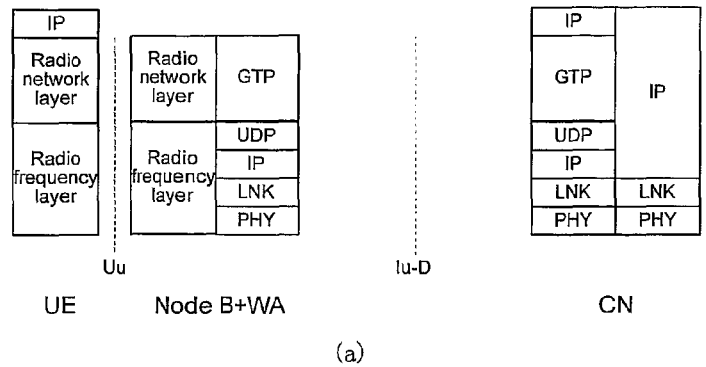
Figure 8:
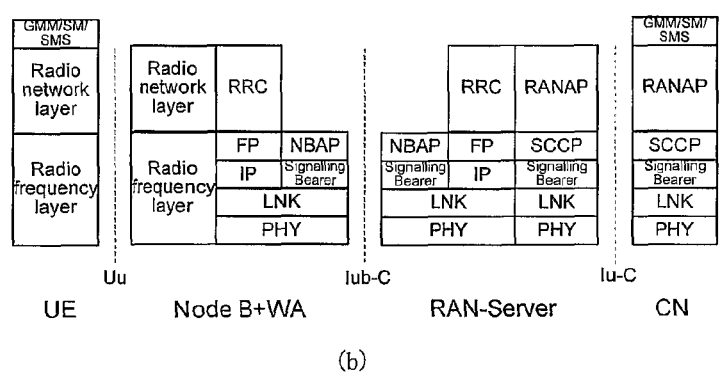
Figure 8:
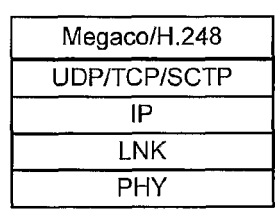

A new architecture of a radio network according to an embodiment is shown in FIG. 7. Referring to FIG. 7, an interface between a network element UE and a network element BS+WA employs an existing interface Uu originally configured between the UE and a UTRAN, and an interface Iub between a Node B and a radio network controller (RNC) no longer exists. A newly defined interface Iub-C is employed between the network element BS+WA and the RAN-Server. An interface Iu-D between the network element BS+WA and a core network (CN) employs a user plane of an existing interface Iu originally configured between the RNC and an SGSN. An interface Iu-C between the RAN-Server and the CN employs a control plane of the existing interface Iu originally configured between the RNC and the SGSN. A control plane of an existing interface Iur originally configured between the RNCs is employed between the RAN-Servers. Furthermore, an additional interface between one network element BS+WA and another BS+WA employs an existing Iur interface originally configured between the RNCs. Definitions of enhanced mobile network interfaces with radio interface functions moved downward and a protocol stack thereof are shown in FIG. 8.

In an embodiment, a control function and a bearer function are further decomposed for the PS domain of the CN. One way of functional decomposition is to define functional units: a serving GPRS support node server (SGSN-Server), a serving GPRS support node gateway (SGSN-GW), a gateway GPRS support node server (GGSN-Server), and a gateway GPRS support node gateway (GGSN-GW). The SGSN-Server has control plane functions of the original SGSN, including mobility management, connection management, session management, and the like. The SGSN-GW has user plane functions of the original SGSN. The GGSN-Server has control plane functions of the original GGSN. The GGSN-GW has user plane functions of the original GGSN.

Accordingly, a radio network architecture according to an embodiment is shown in FIG. 9. Referring to FIG. 9, the RAN is identical to that in FIG. 7. In the CN, an interface Iu-D between the SGSN-GW and the BS+WA employs a user plane of an existing interface Iu originally configured between the RNC and the SGSN. An interface Iu-C between the SGSN-Server and the RAN-Server employs a control plane of the existing interface Iu originally configured between the RNC and the SGSN. An interface Gn-D between the SGSN-GW and the GGSN-GW employs a user plane of an existing interface Gn originally configured between the GGSN and the SGSN. An interface Gn-C between the SGSN-Server and the GGSN-Server employs a control plane of the existing interface Gn originally configured between the GGSN and the SGSN. An interface between the SGSN-Server and the SGSN-GW employs Megaco of IETF or H.248 of ITU-T, or a completely new protocol stack. The SGSN-Server manages the SGSN-GW via Megaco/H.248. An interface between the GGSN-Server and the GGSN-GW employs the Megaco of IETF or H.248 of ITU-T, or a completely new protocol stack. The GGSN-Server manages the GGSN-GW via Megaco/H.248, as shown in FIG. 8(c).

In a second embodiment, functions of the PS domain of the CN are decomposed in a manner of defining functional units: an integrated GPRS support node server (IGSN-Server) and an integrated GPRS support node gateway (IGSN-GW). The IGSN-Server has control plane functions of both the original SGSN and GGSN. The IGSN-GW has user plane functions of both the original SGSN and GGSN.

Accordingly, a new radio network architecture is shown in FIG. 10. Referring to FIG. 10, the RAN is identical to that in FIG. 7. In the CN, an interface Iu-D between the IGSN-GW and the BS+WA employs a user plane of an existing interface Iu originally configured between the RNC and the SGSN. An interface Iu-C between the IGSN-Server and the RAN-Server employs a control plane of the existing interface Iu originally configured between the RNC and the SGSN. An interface between the IGSN-Server and the IGSN-GW employs Megaco of IETF or H.248 of ITU-T, or a completely new protocol stack. The IGSN-Server manages the IGSN-GW via Megaco/H.248.

Accordingly, another radio network architecture according to an embodiment is shown in FIG. 11. Referring to FIG. 11, the RAN-Server and the IGSN-Server are integrated into one network element, which is referred to as a wireless-server (W-Server). The IGSN-GW remains unchanged. A newly defined interface Iub-C is employed between the BS+WA and the W-Server. An interface between the W-Server and the IGSN-GW employs Megaco of IETF or H.248 of ITU-T, or a completely new protocol stack. The W-Server manages the IGSN-GW via Megaco/H.248. An interface Iur-C between the W-Servers employs a control plane of an existing interface Iur originally configured between the RNCs.

Therefore, a method for an interconnection between an optical access network (OAN) and a radio network according to a first embodiment is shown in FIG. 12. Referring to FIG. 12, the BS and WA of a 3G/2G radio communication network are interconnected with the OAN at a reference point (a) within the OAN via an AF. The RAN-Server and the CN are interconnected with an optical line terminal (OLT) at a reference point v within the OAN. Such a solution enables the construction of a 3G/2G access network to make full use of the resources already allocated for the existing OAN network. For example, if an operator already has an FTTB/FTTC network, the copper wire resources in the building are directly utilized when allocating 3G/2G radio communication network equipments in the building, and the 3G/2G radio communication network equipments access the OAN network via optical network units (ONUs), thereby avoiding the additional wiring for the radio communication network and reducing the construction cost of the 3G/2G access network. The solution belongs to a tight-coupling solution.

In this solution, the network elements BS and WA are integrated into one network element, and the integrated network element BS+WA may be separated from the AF and interconnected with the AF at a reference point T. Alternatively, the network elements BS, WA, and AF are integrated into one network element. The RAN-Server and the network element OLT may be integrated into one network element.

Taking WCDMA as an example, the protocol stack under the path of UE->Node B->ONU->OLT->Core Network has a user plane shown in FIGS. 13 and 14, and a control plane shown in FIGS. 15 and 16. The functional decomposition of the BS, WA, and RAN-Server is shown in Table 1. The CN includes the SGSN and the GGSN. The SGSN and the GGSN may also be integrated into a new network element IGSN. The CN may also be accomplished according to the solution shown in FIGS. 9 and 10.

Based upon the above protocol stack structure, the UE first establishes a radio resource control (RRC) connection via a control plane protocol stack and then starts to establish a radio access bearer (RAB) after negotiating with the CN during the data communication. During the establishment of the RAB, a user plane radio bearer (RB) is also established. Once the RAB has been successfully established, the user may transmit data via the established user plane bearer. The compression/decompression function of the PDCP may be enabled or not. Considering a signaling establishment process, the UE establishes an RRC connection with the UTRAN and then establishes a signaling connection with the CN via the RNC, which is also referred to as "NAS signaling establishment process" and suitable for exchanging the NAS information between signaling of the UE and that of the CN, for example, authentication, service request, and connection establishment. A transmission process of user plane data with the compression/decompression function being enabled is described as follows.

In terms of the uplink, the application layer data of the UE is encapsulated into an IP packet or PPP packet and then transmitted to a PDCP protocol of a radio network layer (RNL). Next, the PDCP protocol compresses a header of the data packet and delivers the compressed data to an RLC/MAC of the RNL. Then, the RLC/MAC protocol adds an RLC/MAC header to the data packet after receiving and processing the data packet, and then transmits the data packet to a radio frequency layer (RFL) of WCDMA. Then, the RFL performs encoding, modulation, and other operations on the received data packet and transmits the processed data packet to the UTRAN via the Uu interface. An RFL layer of WCDMA of the BS+WA in the UTRAN receives the data and transmits the data to a MAC/RLC protocol of the RNL. Then, the MAC/RLC protocol removes the protocol headers sequentially, reassembles and combines the data, and then transmits the data to the PDCP protocol of the RNL. The PDCP protocol decompresses the compressed data packet headers. Then, the network element BS+WA forwards the decompressed data to the CN through a GTP tunnel via the interface Iu-D. The GTP tunnel protocol, UDP, and IP at the interface Iu-D between the WA and the CN may be directly carried on the OAN network. The OAN network between the WA and the CN may employ a Layer 2 bridging technology (for example, Ethernet bridging). That is, the AF, ONU/ONT, and OLT are all Layer 2 network elements. Alternatively, a Layer 3 routing technology (for example, IP Layer 3 routing) is employed between the WA and the CN. That is, the AF, ONU/ONT, and OLT are all Layer 3 network elements.

The network element BS+WA divides the GTP/UDP/IP packet into LNK frames and then carries them on the physical layer between the Node B and the AF and transmits them to the AF. The AF converts the LNK frames into ONU LNK frames and then carries them on the physical layer between the ONU/ONT and the AF and transmits them to the ONU/ONT. The ONU/ONT converts the ONU/ONT LNK frames into ODN LNK frames suitable for optical transmission, then performs an electro-optical conversion to carry them on the ODN physical layer, and transmits them to the OLT via an optical fiber. The OLT PHY performs a photoelectric conversion to obtain the ODN LNK frames and then converts the ODN LNK frames into the LNK frames and transmits them to the CN for further processing.

In the CN, the SGSN/SGSN-GW receives the data from the GTP tunnel of the interface Iu-D, performs processing on transport network layer and radio network layer of the interface Iu-D, and then transmits the processed data to the GGSN/GGSN-GW via the interface Gn/Gn-D through the GTP tunnel. The data received by the GGSN/GGSN-GW through the GTP tunnel via the interface Gn/Gn-D is the IP packet or PPP packet from the UE. Then, the GGSN/GGSN-GW transmits the data in the form of an IP packet or PPP protocol packet to an external network via an interface Gi. Alternatively, the IGSN/IGSN-GW performs processing on the transport network layer and radio network layer of the interface Iu-D. The data received through the GTP tunnel of the interface Iu-D is the IP packet or PPP packet from the UE. Then, the IGSN/IGSN-GW transmits the processed data to the external network in the form of an IP packet or PPP protocol packet.

The downlink is similar to the uplink, except that the PDCP protocol in the BS+WA is responsible for compressing the header of the downlink data and the PDCP protocol in the UE is responsible for decompressing the header of the downlink data.

A transmission process of the control plane signaling according to the embodiment is described as follows.

In terms of the uplink, the RRC of the UE encapsulates a GMM/SM/SMS message or a signaling message of the current layer into a data packet and transmits the data packet to the RLC/MAC of the RNL. The RLC/MAC protocol adds an RLC/MAC header to the data packet after receiving and processing the data packet, and then transmits the data packet to an RFL layer of WCDMA. The RFL layer performs encoding, modulation, and other operations on the received data packet and then transmits the data packet to the UTRAN via the Uu interface. An RFL layer of WCDMA of the BS+WA in the UTRAN receives and transmits the data to a MAC/RLC protocol of the RNL. The MAC/RLC protocol removes the protocol headers sequentially, reassembles and combines the data, and then transmits the data to the RRC protocol of the RNL. Generally, the RRC protocol directly resolves the signaling message and performs corresponding processing such as connection establishment, and measurement report.

However, as for the functions of relocation between one BS+WA and another BS+WA, multi-cell radio resource management, broadcast distribution, paging control, and RANAP/RNSAP message forwarding, the RRC of the BS+WA directly carries the corresponding signaling message via the radio network layer (for example, FP) and transport network layer (for example, IP/LNK/PHY) of the interface Iub-C, and informs the RRC layer of the RAN-Server about the processing result, and then forwards the signaling message to the CN through the RAN-Server via the radio network layer (for example, NANAP) and transport network layer (for example, SCCP/M3UA/SCTP/IP/LNK/PHY, and M3UA/SCTP/IP is the signaling bearer layer in the figure) of the interface Iu-C. The RRC, radio network layer (for example, FP or NBAP) and transport network layer (for example, IP layer or signaling bearer layer (for example, SCTP/IP)) of the interface Iub-C between the WA and the RAN-Server may be directly carried on the OAN network. The OAN network between the WA and the RAN-Server may employ a Layer 2 bridging technology (for example, Ethernet bridging). That is, the AF, ONU/ONT, and OLT are all Layer 2 network elements. Alternatively, a Layer 3 routing technology (for example, IP routing) is employed between the WA and the RAN-Server. That is, the AF, ONU/ONT, and OLT are all Layer 3 network elements.

The BS+WA divides the FP/IP or NBAP/SCTP/IP packet of the interface Iub-C into LNK frames, carries the LNK frames on the physical layer between the Node B and the AF, and transmits them to the AF. The AF converts the LNK frames into ONU LNK frames, carries the ONU LNK frames on the physical layer between the ONU/ONT and the AF, and then transmits them to the ONU/ONT. The ONU/ONT converts the ONU/ONT LNK frames into ODN LNK frames suitable for optical transmission, then performs an electro-optical conversion to carry them on the ODN physical layer, and transmits them to the OLT via an optical fiber. The OLT PHY performs a photoelectric conversion to obtain the ODN LNK frames, converts the ODN LNK frames into the LNK frames, and then transmits the LNK frames to the RAN-Server for further processing. The RAN-Server performs processing on transport network layer and radio network layer of the interface Iub-C, obtains RNL frames of the RRC from the FP, and transmits the RNL frames to the MAC/RLC protocol of the RNL. The MAC/RLC protocol removes the protocol headers sequentially, reassembles and combines the data, and then transmits the data to the RRC. The RRC protocol decompresses the compressed data packet header to obtain the data packet, and then transmits the data packet to a network element of the CN after performing the processing on the radio network layer and transport network layer of the interface Iu-C.

In the CN, the IGSN/SGSN/IGSN-Server/SGSN-Server performs processing on the transport network layer and radio network layer of the interface Iu-C and obtains the GMM/SM/SMS message from the RANAP.

Similarly, the UE receives a signaling message from the CN and an RRC signaling message from the access network through an opposite process. In the above protocol stack processing model, the RRC layer is respectively realized by the RAN-Server and the BS. In this way, directed to different functions of the RRC, fast connection establishment, fast feedback, resource allocation functions and the like are implemented in the BS; whereas data management, data storage, processing content of a plurality of BSs, and the like are implemented in the RAN-Server.

A method for an interconnection between an OAN network and a radio network according to a second embodiment is shown in FIG. 17. Referring to FIG. 17, a BS and WA of a 3G/2G radio communication network are interconnected with an OAN broadband network at an ODN. An RAN-Server and a CN are interconnected with an OLT at a reference point v within the OAN. This solution belongs to a tight-coupling solution. The 3G/2G radio communication network directly utilizes the optical network resources of the OAN. For example, if an operator already has an FTTH network, WiMAX equipment directly accesses an OAN network when being allocated in the building. In this solution, the network element BS+WA is integrated with functions of an ONU/ONT. The RAN-Serve and the network element OLT may be integrated into one network element.

Taking WCDMA as an example, the protocol stack under the path of the UE->Node B->ONU->OLT->Core Network has a user plane shown in FIG. 18, and a control plane shown in FIG. 19. The functional decomposition of the BS, WA, and RAN-Server is shown in Table 1. The CN includes an SGSN and a GGSN. The SGSN and the GGSN may be integrated into a new network element IGSN. The CN may also be implemented according to the solution shown in FIGS. 9 and 10.

According to the method of the present disclosure, a transmission process of user plane data with the compression/decompression function being enabled is described as follows.

In terms of the uplink, the application layer data of the UE is encapsulated into an IP packet or PPP packet and then transmitted to a PDCP protocol of an RNL. The PDCP protocol compresses the header of the data packet and delivers the compressed data to an RLC/MAC of the RNL. The RLC/MAC protocol adds an RLC/MAC header to the data packet after receiving and processing the data packet, and then transmits the data packet to an RFL layer of WCDMA. The RFL layer performs encoding, modulation, and other operations on the received data packet and transmits the data packet to a UTRAN via an interface Uu. Then, an RFL layer of WCDMA of the BS+WA+ONU/ONT in the UTRAN receives and transmits the data to a MAC/RLC protocol of the RNL. The MAC/RLC protocol removes the protocol headers sequentially, reassembles and combines the data, and then transmits the data to the PDCP protocol of the RNL. The PDCP protocol decompresses the compressed data packet header. The network element BS+WA+ONU/ONT forwards the decompressed data to the CN through a GTP tunnel via an interface Iu-D. The GTP tunnel protocol, UDP, and IP of the interface Iu-D between the WA and the CN may be directly carried on the OAN network. The OAN network between the WA and the CN may employ a Layer 2 bridging technology (for example, Ethernet bridging). That is, the OLT is a Layer 2 network element. Alternatively, a Layer 3 routing technology (for example, IP routing) is employed between the WA and the CN. That is, the OLT is a Layer 3 network element.

The network element BS+WA+ONU/ONT divides the GTP/UDP/IP packet into ODN LNK frames suitable for optical transmission, then performs an electro-optical conversion to carry them on the ODN physical layer, and transmits them to the OLT via an optical fiber. The OLT PHY performs a photoelectric conversion to obtain the ODN LNK frames and then converts the ODN LNK frames into the LNK frames, and then transmits the LNK frames to the CN for further processing.

In the CN, the SGSN/SGSN-GW receives the data from the GTP tunnel of the interface Iu-D, performs processing on transport network layer and radio network layer of the interface Iu-D, and then transmits the processed data to the GGSN/GGSN-GW through the GTP tunnel via the interface Gn/Gn-D. The data received by the GGSN/GGSN-GW through the GTP tunnel of the interface Gn/Gn-D is the IP packet or PPP packet of the UE. Then, the GGSN/GGSN-GW transmits the data in the form of an IP packet or PPP protocol packet to an external network via an interface Gi. Alternatively, the IGSN/IGSN-GW performs processing on transport network layer and radio network layer of the interface Iu-D. The data received through the GTP tunnel of the interface Iu-D is the IP packet or PPP packet from the UE. Then, the IGSN/IGSN- GW transmits the processed data to the external network in the form of an IP packet or PPP protocol packet.

The downlink is similar to the uplink, except that the PDCP protocol in the BS+WA+ONU/ONT is responsible for compressing the header of the downlink data, and the PDCP protocol in the UE is responsible for decompressing the header of the downlink data.

A transmission process of control plane signaling according to another embodiment is shown in FIG. 19, which is described as follows.

In terms of the uplink, the RRC of the UE encapsulates a GMM/SM/SMS message or a signaling message of the current layer into a data packet and transmits the data packet to the RLC/MAC of the RNL. The RLC/MAC protocol adds an RLC/MAC header to the data packet after receiving and processing the data packet, and then transmits the data packet to an RFL layer of WCDMA. The RFL layer performs encoding, modulation, and other operations on the received data packet and transmits the data packet to a UTRAN via an interface Uu. An RFL layer of WCDMA of the BS+WA+ONU/ONT in the UTRAN receives and transmits the data to a MAC/RLC protocol of the RNL. The MAC/RLC protocol removes the protocol headers sequentially, reassembles and combines the data, and then transmits the data to the RRC protocol of the RNL. Generally, the RRC protocol directly resolves the signaling message and performs corresponding processing, such as connection establishment, and measurement report. However, as for the functions of relocation between one BS+WA+ONU/ONT and another BS+WA+ONU/ONT, multi-cell radio resource management, broadcast distribution, paging control, and RANAP/RNSAP message forwarding, the RRC of the BS+WA+ONU/ONT directly carries the corresponding signaling message via the radio network layer (for example, FP) and transport network layer (for example, IP/LNK/PHY) of the interface Iub-C, and informs the RRC layer of the RAN-Server about the processing result, and then forwards the signaling message to the CN through the RAN-Server via the radio network layer (for example, NANAP) and transport network layer (for example, SCCP/M3UA/SCTP/IP/LNK/PHY, and M3UA/SCTP/IP is the signaling bearer layer in the figure) of the interface Iu-C. The RRC, radio network layer (for example, FP or NBAP), and transport network layer (for example, IP layer or signaling bearer layer (for example, SCTP/IP)) of the interface Iub-C between the WA and the RAN-Server may be directly carried on the OAN network. The OAN network between the WA and the RAN-Server may employ a Layer 2 bridging technology (for example, Ethernet bridging). That is, the OLT is a Layer 2 network element. Alternatively, a Layer 3 routing technology (for example, IP routing) is employed between the WA and the RAN-Server. That is, the OLT is a Layer 3 network element.

The network element BS+WA divides the FP/IP or NBAP/SCTP/IP packet of the interface Iub-C into ODN LNK frames suitable for optical transmission, then performs an electro-optical conversion to carry them on the ODN physical layer, and transmits them to the OLT via an optical fiber. Then, the OLT PHY performs a photoelectric conversion to obtain the ODN LNK frames, then converts the ODN LNK frames into the LNK frames, and then transmits the LNK frames to the RAN-Server for further processing. The RAN-Server performs processing on transport network layer and radio network layer of the interface Iub-C, obtains RNL frames of the RRC from the FP, and transmits the RNL frames to the MAC/RLC protocol of the RNL. The MAC/RLC protocol removes the protocol headers sequentially, reassembles and combines the data, and then transmits the data to the RRC. The RRC protocol decompresses the compressed data packet header to obtain the data packet, and then transmits the data packet to a network element of the CN after performing the processing on radio network layer and transport network layer of the interface Iu-C.

In the CN, the IGSN/SGSN/IGSN-Server/SGSN-Server performs processing on the transport network layer and radio network layer of the interface Iu-C, and obtains the GMM/SM/SMS message from the RANAP.

Similarly, the UE receives a signaling message from the CN and an RRC signaling message from the access network through an opposite process.

In another embodiment, in order to implement a network interconnection by moving downward the radio network layer, functions of a radio access network (RAN) are decomposed, and the following functional units are defined: a BS, a wireless adaptor (WA), a radio access network server (RAN-Server), and a radio gateway (RGW), and their respective functions are divided as follows.

As for the RAN of a WCDMA/GPRS/TD-SCDMA network, the functional decomposition of the BS, WA, RAN-Server, and RGW is shown in Table 2. The functions of the WA can be moved downward to the BS.

TABLE 2

Functional Decomposition of BS, WA, and RGW

| Function | BS | WA (with functions moved downward) | RAN-Server | RGW |
|---|---|---|---|---|
| Physical Layer (PHY) | Mandatory | | | |
| Media Access Control (MAC) | | Mandatory | | |
| Radio Link Control (RLC) | | Mandatory | | |
| Broadcast/Multicast Control (BMC) | | Optional | Optional | |
| Packet Data Convergence Protocol (PDCP) | | Mandatory | | |
| Radio Resource Control (RRC) | | | | |
| Multi-cell Radio Resource Management (MC-RRM) | | | Optional | |
| Cell-specific Radio Resource Management (CS-RRM) | | Mandatory | | |
| Broadcast Distribution | | | Mandatory | |
| Handover Control (HO Control) | | Mandatory | | |
| Paging Control | | | Optional | |
| Admission Control | Optional | | | |
| Intra-cell Control | Optional | | | |
| Inter-cell Control | | | Optional | |
| Relocation Control | | | Mandatory | |
| QoS Scheduling | Optional | | | |
| RANAP Message Forwarding | | | Optional | |
| RNSAP Message Forwarding | | | Optional | |
| Adaptation of Network Elements CN/RNC of New Architecture with That of the Conventional Architecture | | | | Mandatory |

TABLE 2-continued

Functional Decomposition of BS, WA, and RGW

| Function | BS | WA (with functions moved downward) | RAN-Server | RGW |
|---|---|---|---|---|
| Handover Control between Wired Access and Radio Access | | | Optional | |

Figure 1:
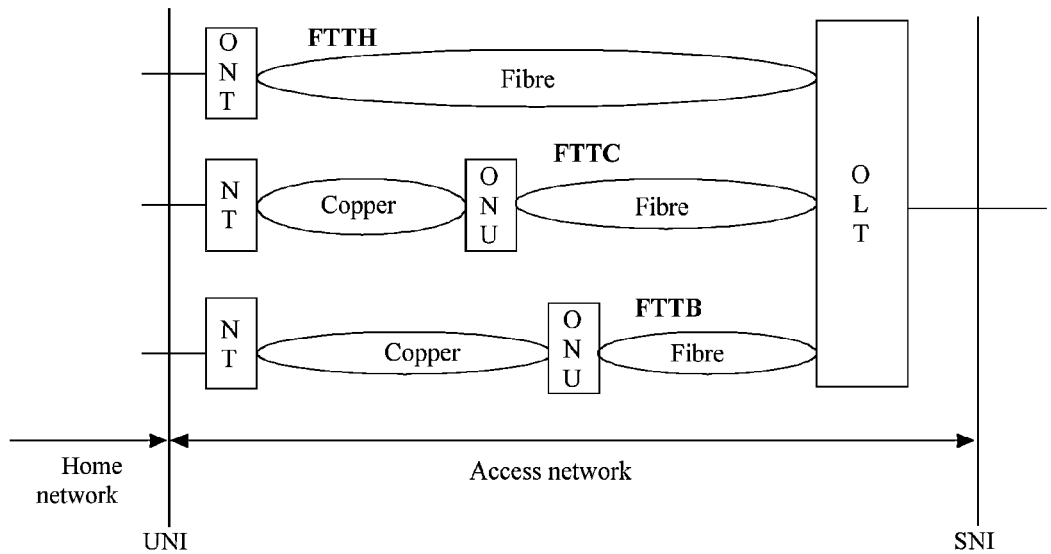
FIG. 1 is a schematic view of a main network architecture of an FTTx network in the prior art.
Figure 2:
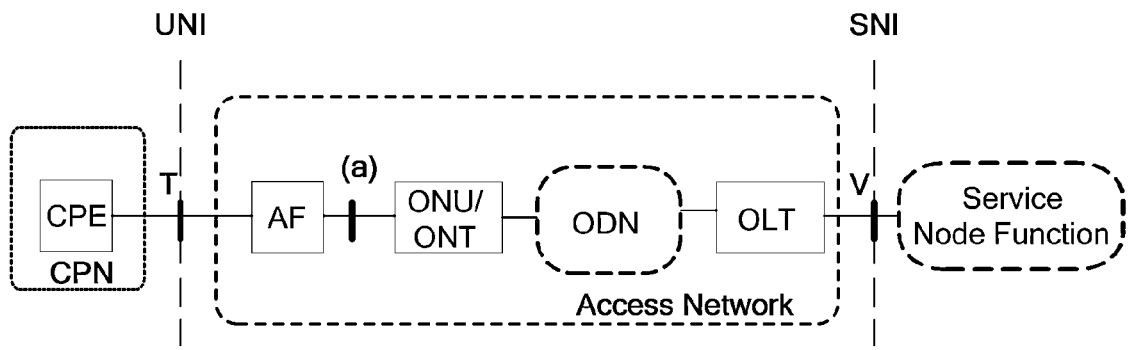
FIG. 2 is a schematic view of a reference architecture of an OAN network in the prior art.
Figure 3:
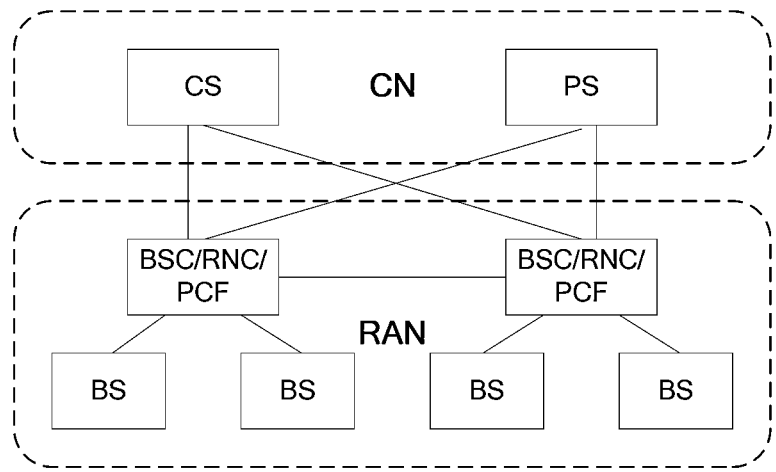
FIG. 3 is a schematic view of a reference architecture of an access network of a 3G/2 G communication system in the prior art.
Figure 4:
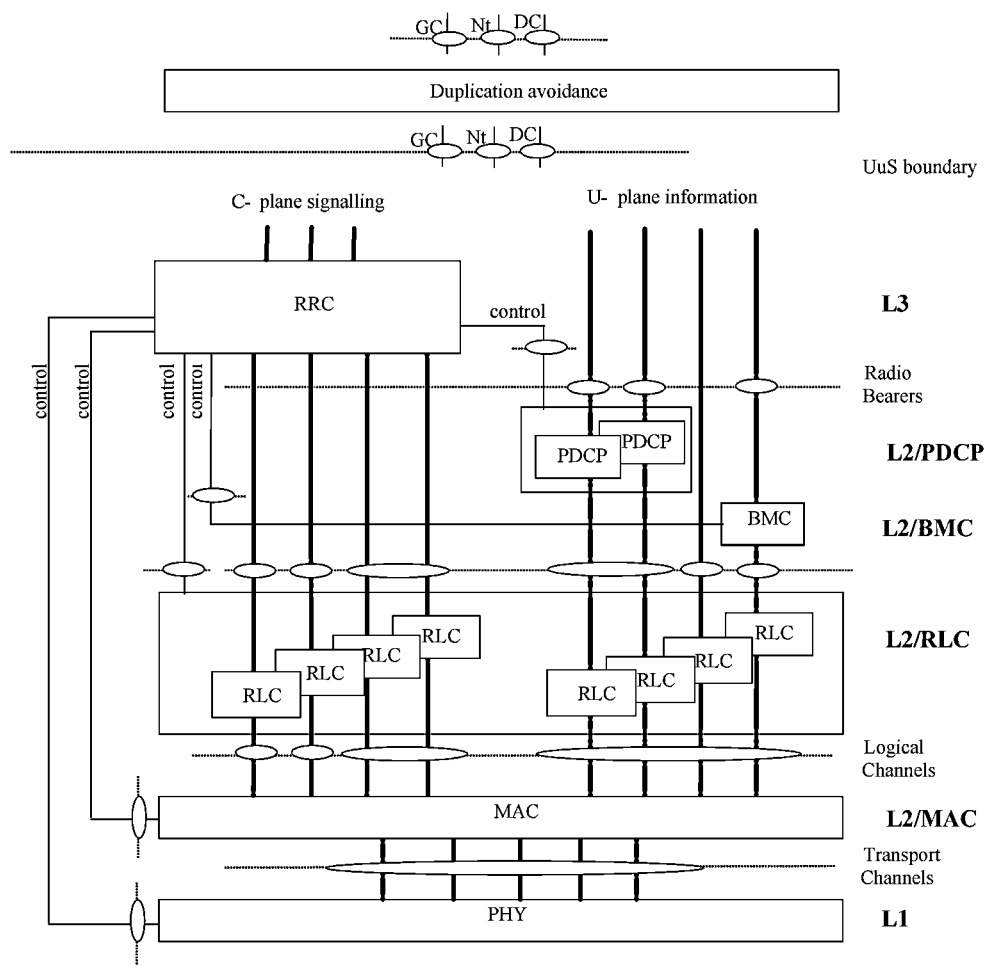
FIG. 4 is a schematic view of an architecture of a radio interface protocol stack in the prior art.
Figure 5:
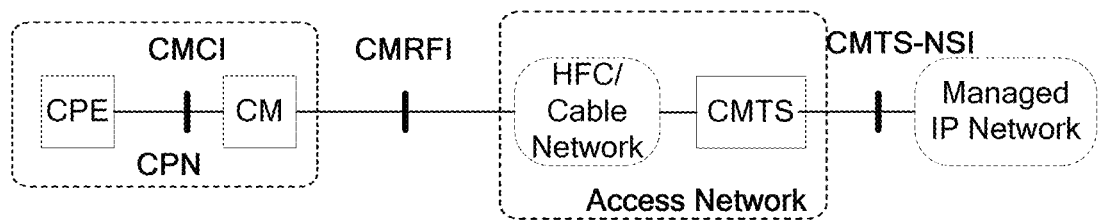
FIG. 5 is a schematic view of a reference architecture of a PacketCable based on the HFC access network in the prior art.
Figure 6:
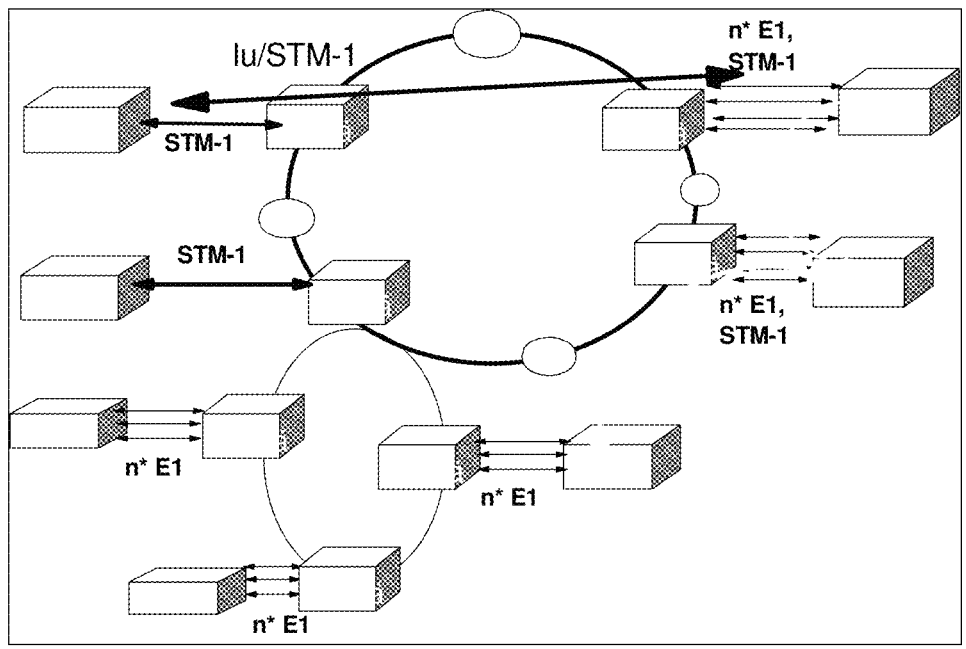
FIG. 6 is a schematic view of a typical WCDMA networking transmission mode in the prior art.

Based on the network with decomposed functions of the BS, WA, RAN-Server, and RWG as shown in FIG. 2, a control function and a bearer function of a base station controller (BSC) (for example, RNC) in the prior art are decomposed. The functions are decomposed into three network elements, namely, a radio access network server (RAN-Server), a radio gateway (RGW), and a BS+WA. The original radio interface protocol (for example, a portion of RRC, PDCP/BMC/RLC/MAC of an RNL protocol stack) is moved downward to the WA of the BS (for example, Node B). The main function of the RGW is the adaptation of network elements CN/RNC of the new architecture with that of a conventional architecture. The main function of the RAN-Server includes relocation between one BS+WA and another BS+WA, multi-cell radio resource management, broadcast distribution, paging control, RANAP/RNSAP message forwarding, and the like. In addition, the RAN-Server also has the function of handover control between a wired access and a radio access, so as to support the control of the handover between the wired access and the radio access. A many-to-many connection relationship is employed between the BS+WA and the RGW. A one-to-many or many-to-many connection relationship is employed between the RAN-Server and the RGW.

Figure 21:
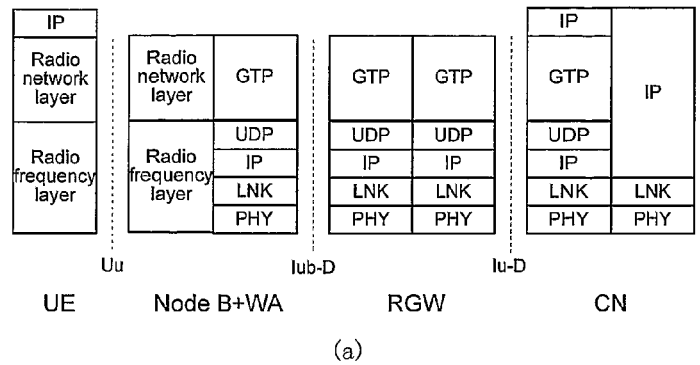
Figure 21:
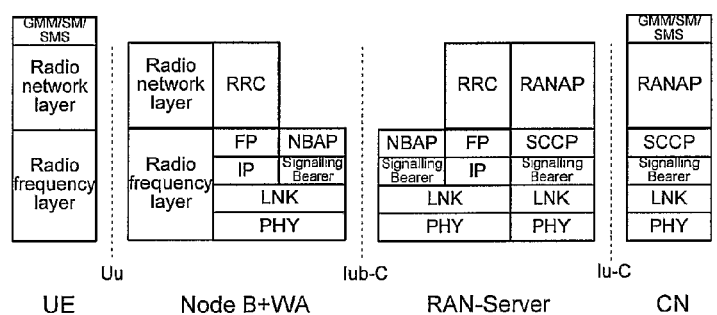
Figure 21:
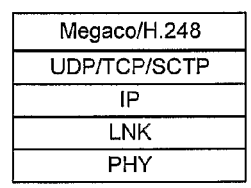

A radio network architecture of a system of the present disclosure is shown in FIG. 20. Referring to FIG. 20, an interface between a network element UE and a network element BS+WA employs an existing interface Uu originally configured between the UE and a UTRAN, and an interface Iub between a Node B and an RNC no longer exists. An interface Iub-D between the network element BS+WA and an RGW employs a user plane of an existing interface Iu originally configured between the RNC and an SGSN. A newly defined interface Iub-C is employed between the network element BS+WA and an RAN-Server. An interface between the RAN-Server and the RGW employs Megaco of IETF or H.248 of ITU-T, or a completely new protocol stack. The RAN-Server manages the RGW via Megaco/H.248. An interface Iu-D between the RGW and the CN employs a user plane of the existing interface Iu originally configured between the RNC and the SGSN. An interface Iu-C between the RAN-Server and the CN employs a control plane of the existing interface Iu originally configured between the RNC and the SGSN. A control plane of an existing interface Iur originally configured between the RNCs is employed between the RAN-Servers. A user plane of the existing interface Iur originally configured between the RNCs is employed between the RGWs. Furthermore, an additionally added interface between one BS+WA and another BS+WA employs the existing Iur interface originally configured between the RNCs. Definitions of enhanced mobile network interfaces with the radio interface functions moved downward and a protocol stack thereof is shown in FIG. 21.

According to a system and a method of the present disclosure, a control function and a bearer function are further decomposed for a PS domain of the CN. One way of functional decomposition is to define functional units: a serving GPRS support node server (SGSN-Server), a serving GPRS support node gateway (SGSN-GW), a gateway GPRS support node server (GGSN-Server), and a gateway GPRS support node gateway (GGSN-GW). The SGSN-Server has functions of the original SGSN control plane, including mobility management, connection management, session management, and the like. The SGSN-GW has functions of the original SGSN user plane. The GGSN-Server has functions of the original GGSN control plane. The GGSN-GW has functions of the original GGSN user plane.

A radio network architecture of a system according to the first embodiment is shown in FIG. 22. Referring to FIG. 22, the RAN is identical to that in FIG. 20. In the CN, an interface Iu-D between the SGSN-GW and the RGW employs a user plane of an existing interface Iu originally configured between the RNC and the SGSN. An interface Iu-C between the SGSN-Server and the RAN-Server employs a control plane of the existing interface Iu originally configured between the RNC and the SGSN. An interface Gn-D between the SGSN-GW and the GGSN-GW employs a user plane of an existing interface Gn originally configured between the GGSN and the SGSN. An interface Gn-C between the SGSN-Server and the GGSN-Server employs a control plane of the existing interface Gn originally configured between the GGSN and the SGSN. An interface between the SGSN-Server and the SGSN-GW employs Megaco of IETF or H.248 of ITU-T, or a completely new protocol stack. The SGSN-Server manages the SGSN-GW via Megaco/H.248. An interface between the GGSN-Server and the GGSN-GW employs Megaco of IETF or H.248 of ITU-T, or a completely new protocol stack. The GGSN-Server manages the GGSN-GW via Megaco/H.248.

In an embodiment of the present disclosure, functions of the PS domain of the CN are decomposed in a manner of defining functional units: an integrated GPRS support node server (IGSN-Server) and an integrated GPRS support node gateway (IGSN-GW). The IGSN-Server has control plane functions of both the original SGSN and GGSN. The IGSN-GW has user plane functions of both the original SGSN and GGSN.

Accordingly, a new radio network architecture according to an embodiment is shown in FIG. 23. Referring to FIG. 23, the RAN is identical to that in FIG. 20. Another way of functional decomposition for the functions of the PS domain of the CN in the present disclosure is to define functional units: an integrated GPRS support node server (IGSN-Server) and an integrated GPRS support node gateway (IGSN-GW). The IGSN-Server has control plane functions of both the original SGSN and GGSN. The IGSN-GW has user plane functions of both the original SGSN and GGSN.

A new radio network architecture according to an embodiment of the present disclosure is shown in FIG. 24. Referring to FIG. 24, the RAN-Server and the IGSN-Server are integrated into one network element, which is referred to as a wireless-server (W-Server) and has control plane functions of the original RNC, SGSN, and GGSN. The RGW and the IGSN-GW are integrated into one network element, which is referred to as a wireless gateway (WGW) and has user plane functions of the original RNC, SGSN, and GGSN. An interface Iub-D between the network element BS and the WGW employs a user plane of an existing interface Iu originally configured between the RNC and the SGSN. A newly defined interface Iub-C is employed between the network element BS and the W-Server. An interface between the W-Server and the WGW employs Megaco of IETF or H.248 of ITU-T, or a completely new protocol stack. The W-Server manages the WGW via Megaco/H.248. A control plane of an existing interface Iur originally configured between the RNCs is employed between the W-Servers. A user plane of the existing interface Iur originally configured between the RNCs is employed between the WGWs. An additionally added interface between one BS and another BS employs the existing interface Iur originally configured between the RNCs.

A first embodiment of an interconnection between an optical access network (OAN) and a radio network according to a method of the present disclosure is shown in FIGS. 25 and 26. Referring to FIGS. 25 and 26, a BS and WA of a 3G/2G radio communication network are interconnected with the OAN at a reference point (a) within the OAN via an AF. A RGW or a WRW of the 3G/2G radio communication network is interconnected with an OLT at a reference point v. Such a solution enables the 3G/2G access network to make full use of the resources already allocated for the existing OAN network during construction. For example, if an operator already has an FTTB/FTTC network, the copper wire resources in the building are directly utilized when allocating 3G/2G radio communication network equipments in a building, and the 3G/2G radio communication network equipments access the OAN network via ONUs, thereby avoiding the additional wiring for the radio communication network and reducing the construction cost of the 3G/2G access network. The solution belongs to a tight-coupling solution.

In the present disclosure, the BS and the WA are integrated into one network element. The integrated network element BS+WA and the AF may be separated as different network elements, and they are interconnected with each other at a reference point T. Alternatively, the network elements BS, WA, and AF are integrated into one network element. The network elements RGW and OLT may be integrated into one network element.

Taking WCDMA as an example, the protocol stack under the path of UE->Node B->ONU->OLT->Core Network has a user plane as shown in FIGS. 27-29, and a control plane as shown in FIGS. 30-32. The functional decomposition of the BS, WA, and RAN-Server is shown in Table 1. The CN includes the SGSN and the GGSN. The SGSN and the GGSN may also be integrated into a new network element IGSN. The CN may also be implemented according to the solution shown in FIGS. 22 and 23.

Based upon the above protocol stack structure, the user equipment (UE) first establishes a radio resource control (RRC) connection via a control plane protocol stack and starts to establish a radio access bearer (RAB) after negotiating with the CN during the data communication. During the establishment of the RAB, a user plane radio bearer (RB) is also established. Once the RAB has been successfully established, the user may transmit data via the established user plane bearer. The compression/decompression function of the PDCP may be enabled or not. Considering a signaling establishment process, the UE establishes an RRC connection with the UTRAN and then establishes a signaling connection with the CN via the RNC, which is also referred to as "NAS signaling establishment process" and suitable for exchanging the NAS information between signaling of the UE and that of the CN, for example, authentication, service request, and connection establishment.

In an embodiment of the present disclosure, a transmission process of user plane data with the compression/decompression function being enabled is described as follows.

In terms of the uplink, the application layer data of the UE is encapsulated into an IP packet or PPP packet and then transmitted to a PDCP protocol of an RNL. The PDCP protocol compresses the header of the data packet and delivers the compressed data to an RLC/MAC of the RNL. The RLC/MAC protocol adds an RLC/MAC header to the data packet after receiving and processing the data packet, and then transmits the data packet to an RFL layer of WCDMA. The RFL layer performs encoding, modulation, and other operations on the received data packet, and transmits the data packet to a UTRAN via an interface Uu.

An RFL layer of WCDMA of the BS+WA in the UTRAN receives and transmits the data to a MAC/RLC protocol of the RNL. The MAC/RLC protocol removes the protocol headers sequentially, reassembles and combines the data, and then transmits the data to the PDCP protocol of the RNL. The PDCP protocol decompresses the compressed data packet header. The network element BS+WA forwards the decompressed data to the CN by using a GTP tunnel via an interface Iub-D and through the RGW. The GTP tunnel protocol, UDP, and IP of the interface Iu-D between the WA and the RGW may be directly carried on the OAN network. The OAN network between the WA and the RGW may employ a Layer 2 bridging technology (for example, Ethernet bridging). That is, the AF, ONU/ONT, and OLT are all Layer 2 network elements. Alternatively, a Layer 3 routing technology (for example, IP routing) is employed between the WA and the RGW. That is, the AF, ONU/ONT, and OLT are all Layer 3 network elements.

The network element BS+WA divides the GTP/UDP/IP packet into LNK frames, then carries the LNK frames on the physical layer between the Node B and the AF, and then transmits them to the AF. The AF converts the LNK frames into ONU LNK frames, then carries the ONU LNK frames on the physical layer between the ONU/ONT and the AF, then transmits them to the ONU/ONT. The ONU/ONT converts the ONU/ONT LNK frames into ODN LNK frames suitable for optical transmission, then performs an electro-optical conversion to carry them on the ODN physical layer, and transmits them to the OLT via an optical fiber. Then, the OLT PHY performs a photoelectric conversion to obtain the ODN LNK frames, then converts the ODN LNK frames into the LNK frames, and then transmits the LNK frames to the RGW for further processing. The RGW receives the data through the GTP tunnel via the interface Iub-D, performs processing on radio network layer and transport network layer of the interface Iu-D, and then transmits the data packet to a network element of the CN through the GTP tunnel.

In the CN, the SGSN/SGSN-GW receives the data through the GTP tunnel of the interface Iu-D, performs processing on transport network layer and radio network layer of the interface Iu-D, and then transmits the data to the GGSN/GGSN-GW via the interface Gn/Gn-D through the GTP tunnel. The data received by the GGSN/GGSN-GW through the GTP tunnel of the interface Gn/Gn-D is the IP packet or PPP packet from the UE. Then, the GGSN/GGSN-GW transmits the data in the form of an IP packet or PPP protocol packet to an external network via an interface Gi. Alternatively, the IGSN/IGSN-GW performs the processing on transport network layer and radio network layer of the interface Iu-D. The data received through the GTP tunnel of the interface Iu-D is the IP packet or PPP packet from the UE. Then, the IGSN/IGSN-GW transmits the data to the external network in the form of an IP packet or PPP protocol packet.

The downlink is similar to the uplink, except that the PDCP protocol in the BS+WA is responsible for compressing the header of the downlink data, and the PDCP protocol in the UE is responsible for decompressing the header of the downlink data.

A transmission process of control plane signaling according to an embodiment of the present disclosure is described as follows.

In terms of the uplink, the RRC of the UE encapsulates a GMM/SM/SMS message or a signaling message of the current layer into a data packet and transmits the data packet to the RLC/MAC of the RNL. The RLC/MAC protocol adds an RLC/MAC header to the data packet after receiving and processing the data packet, and then transmits the data packet to an RFL layer of WCDMA. The RFL layer performs encoding, modulation, and other operations on the received data packet, and transmits the data packet to a UTRAN via an interface Uu. An RFL layer of WCDMA of the BS+WA in the UTRAN receives and transmits the data to the MAC/RLC protocol of the RNL. The MAC/RLC protocol removes the protocol headers sequentially, reassembles and combines the data, and then transmits the data to the RRC protocol of the RNL. Generally, the RRC protocol directly resolves the signaling message and performs corresponding processing, such as connection establishment, and measurement report.

However, as for functions of relocation between one BS+WA and another BS+WA, multi-cell radio resource management, broadcast distribution, paging control, RANAP/RNSAP message forwarding, the RRC of the BS+WA directly carries the corresponding signaling message via the radio network layer (for example, FP) and transport network layer (for example, IP/LNK/PHY) of the interface Iub-C, and informs the RRC layer of the RAN-Server about the processing result, and then forwards the signaling message to the CN through the RAN-Server via radio network layer (for example, NANAP) and transport network layer (for example, SCCP/M3UA/SCTP/IP/LNK/PHY, and M3UA/SCTP/IP is the signaling bearer layer in the figure) of the interface Iu-C.

The RRC, radio network layer (for example, FP or NBAP), and transport network layer (for example, IP layer or signaling bearer layer (for example, SCTP/IP)) of the interface Iub-C between the WA and the RAN-Server may be directly carried on the OAN network. The OAN network between the WA and the RAN-Server may employ a Layer 2 bridging technology (for example, Ethernet bridging). That is, the AF, ONU/ONT, and OLT are all Layer 2 network elements. Alternatively, a Layer 3 routing technology (for example, IP routing) is employed between the WA and the RAN-Server. That is, the AF, ONU/ONT, and OLT are all Layer 3 network elements.

The network element BS+WA divides the FP/IP or NBAP/SCTP/IP packet of the interface Iub-C into LNK frames, then carries the LNK frames on the physical layer between the Node B and the AF, and then transmits them to the AF. The AF converts the LNK frames into ONU LNK frames, carries the ONU LNK frames on the physical layer between the ONU/ONT and the AF, and then transmits them to the ONU/ONT. The ONU/ONT converts the ONU/ONT LNK frames into ODN LNK frames suitable for optical transmission, then performs an electro-optical conversion to carry them on the ODN physical layer, and transmits them to the OLT via an optical fiber. The OLT PHY performs a photoelectric conversion to obtain the ODN LNK frames, converts the ODN LNK frames into the LNK frames, and transmits the LNK frames to the RAN-Server for further processing. The RAN-Server performs processing on transport network layer and radio network layer of the interface Iub-C, obtains RNL frames of the RRC from the FP, and transmits the RNL frames to the MAC/RLC protocol of the RNL. The MAC/RLC protocol removes the protocol headers sequentially, reassembles and combines the data, and transmits the data to the RRC. The RRC protocol decompresses the compressed data packet header to obtain the data packet, and then transmits the data packet to a network element of the CN after performing the processing on radio network layer and transport network layer of the interface Iu-C.

In the CN, the IGSN/SGSN/IGSN-Server/SGSN-Server performs processing on transport network layer and radio network layer of the interface Iu-C and obtains the GMM/SM/SMS message from the RANAP. Similarly, the UE receives a signaling message from the CN and an RRC signaling message from the access network through an opposite process.

In the above protocol stack processing model, the RRC layer is respectively realized by the RAN-Server and the BS. In this way, directed to different functions of the RRC, fast connection establishment, fast feedback, resource allocation functions and the like are implemented in the BS; whereas data management, data storage, processing content of a plurality of BSs, and the like are implemented in the RAN-Server.

In the embodiment of the present disclosure, as shown in FIGS. 33-34, a BS and a WA of a 3G/2G radio communication network are interconnected with an OAN broadband network at an ODN. An RGW or a WRW of the 3G/2G radio communication network is interconnected with an OLT at a reference point v. This solution belongs to a loose-coupling solution. The 3G/2G radio communication network directly utilizes the optical network resources of the OAN. For example, if an operator already has an FTTH network, WiMAX equipment is allocated in a building to directly access an ODN network.

In this solution, the network element BS+WA is integrated with functions of an ONU/ONT The RGW or WGW may be integrated with the network element OLT into one network element.

Taking WCDMA as an example, the protocol stack under the path of UE->Node B->ONU->OLT->Core Network has a user plane shown in FIG. 35, and a control plane shown in FIG. 36. The functional decomposition of the BS, WA, RAN-Server, and RGW is shown in Table 1. The CN includes the SGSN and the GGSN. The SGSN and the GGSN may also be integrated into a new network element IGSN. The CN may also be implemented according to the solution shown in FIGS. 22 and 23.

In an embodiment of the present disclosure, a transmission process of user plane data with the compression/decompression function being enabled is described as follows.

In terms of the uplink, the application layer data of the UE is encapsulated into an IP packet or PPP packet and then transmitted to a PDCP protocol of an RNL. The PDCP protocol compresses the header of the data packet and transmits the compressed data to an RLC/MAC of the RNL. The RLC/MAC protocol adds an RLC/MAC header to the data packet after receiving and processing the data packet, and then transmits the data packet to an RFL layer of WCDMA. The RFL layer performs encoding, modulation, and other operations on the received data packet, and transmits the data packet to a UTRAN via an interface Uu.

An RFL layer of WCDMA of the BS+WA+ONU/ONT in the UTRAN receives and transmits the data to a MAC/RLC protocol of the RNL. The MAC/RLC protocol removes the protocol headers sequentially, reassembles and combines the data, and then transmits the data to the PDCP protocol of the RNL. The PDCP protocol decompresses the compressed data packet header. The network element BS+WA+ONU/ONT forwards the decompressed data to the CN by using a GTP tunnel via an interface Iub-D and through the RGW. The GTP tunnel protocol, UDP, and IP of the interface Iu-D between the WA and the RGW may be directly carried on the OAN network. The OAN network between the WA and the RGW may employ a Layer 2 bridging technology (for example, Ethernet bridging). That is, the OLT is a Layer 2 network element. Alternatively, a Layer 3 routing technology (for example, IP routing) is employed between the WA and the RGW. That is, the OLT is a Layer 3 network element.

The network element BS+WA+ONU/ONT divides the GTP/UDP/IP packet into ODN LNK frames suitable for optical transmission, then performs an electro-optical conversion to carry them on the ODN physical layer, and transmits them to the OLT via an optical fiber. The OLT PHY performs a photoelectric conversion to obtain the ODN LNK frames, converts the ODN LNK frames into the LNK frames, and then transmits the LNK frames to the RGW for further processing. The RGW receives the data through the GTP tunnel via the interface Iub-D, performs processing on radio network layer and transport network layer of the interface Iu-D, and then transmits the data packet to a network element of the CN through the GTP tunnel.

In the CN, the SGSN/SGSN-GW receives the data through the GTP tunnel of the interface Iu-D, performs processing on transport network layer and radio network layer of the interface Iu-D, and then transmits the data to the GGSN/GGSN-GW via the interface Gn/Gn-D through the GTP tunnel. The data received by the GGSN/GGSN-GW through the GTP tunnel of the interface Gn/Gn-D is the IP packet or PPP packet from the UE. Then, the GGSN/GGSN-GW transmits the data in the form of an IP packet or PPP protocol packet to an external network via an interface Gi. Alternatively, the IGSN/IGSN-GW performs the processing on transport network layer and radio network layer of the interface Iu-D. The data received through the GTP tunnel of the interface Iu-D is the IP packet or PPP packet from the UE. Then, the IGSN/IGSN-GW transmits the data to the external network in the form of an IP packet or PPP protocol packet.

The downlink is similar to the uplink, except that the PDCP protocol in the BS+WA+ONU/ONT is responsible for compressing the header of the downlink data, and the PDCP protocol in the UE is responsible for decompressing the header of the downlink data.

A transmission process of control plane signaling is described as follows.

In terms of the uplink, the RRC of the UE encapsulates a GMM/SM/SMS message or a signaling message of the current layer into a data packet, and transmits the data packet to the RLC/MAC of the RNL. The RLC/MAC protocol adds an RLC/MAC header to the data packet after receiving and processing the data packet, and then transmits the data packet to an RFL layer of WCDMA. The RFL layer performs encoding, modulation, and other operations on the received data packet and transmits the data packet to a UTRAN via an interface Uu. Then, an RFL layer of WCDMA of the BS+WA+ONU/ONT in the UTRAN receives and transmits the data to a MAC/RLC protocol of the RNL. The MAC/RLC protocol removes the protocol headers sequentially, reassembles and combines the data, and then transmits the data to the RRC protocol of the RNL. Generally, the RRC protocol directly resolves the signaling message and performs corresponding processing, such as connection establishment and measurement report. However, as for the functions of relocation between one BS+WA+ONU/ONT and another BS+WA+ONU/ONT, multi-cell radio resource management, broadcast distribution, paging control, RANAP/RNSAP message forwarding, the RRC of the BS+WA+ONU/ONT directly carries the corresponding signaling message via radio network layer (for example, FP) and transport network layer (for example, IP/LNK/PHY) of the interface Iub-C, and informs the RRC layer of the RAN-Server about the processing result, and then forwards the signaling message to the CN through the RAN-Server via the radio network layer (for example, NANAP) and transport network layer (for example, SCCP/M3UA/SCTP/IP/LNK/PHY, and M3UA/SCTP/IP is the signaling bearer layer in the figure) of the interface Iu-C. The RRC, radio network layer (for example, FP or NBAP), and transport network layer (for example, IP layer or signaling bearer layer (for example, SCTP/IP)) of the interface Iub-C between the WA and the RAN-Server may be directly carried on the OAN network. The OAN network between the WA and the RAN-Server may employ a Layer 2 bridging technology (for example, Ethernet bridging). That is, the OLT is a Layer 2 network element. Alternatively, a Layer 3 routing technology (for example, IP routing) is employed between the WA and the RAN-Server. That is, the OLT is a Layer 3 network element.

The network element BS+WA divides the FP/IP or NBAP/SCTP/IP packet of the interface Iub-C into ODN LNK frames suitable for optical transmission, then performs an electro-optical conversion to carry them on the ODN physical layer, and transmits them to the OLT via an optical fiber. The OLT PHY performs a photoelectric conversion to obtain the ODN LNK frames, converts the ODN LNK frames into the LNK frames, and transmits the LNK frames to the RAN-Server for further processing. The RAN-Server performs processing on transport network layer and radio network layer of the interface Iub-C, obtains RNL frames of the RRC from FP, and transmits the RNL frames to the MAC/RLC protocol of the RNL. The MAC/RLC protocol removes the protocol headers sequentially, reassembles and combines the data, and then transmits the data to the RRC. The RRC protocol decompresses the compressed data packet header to obtain the data packet, and then transmits the data packet to a network element of the CN after performing the processing on radio network layer and transport network layer of the interface Iu-C.

In the CN, the IGSN/SGSN/IGSN-Server/SGSN-Server performs the processing on transport network layer and radio network layer of the interface Iu-C and obtains the GMM/SM/SMS message from the RANAP. Similarly, the UE receives a signaling message from the CN and a RRC signaling message from the access network through an opposite process.

A flow chart of a processing method according to a specific embodiment of the present disclosure is shown in FIG. 37, which includes the following steps.

In Step 8-1, a radio interface protocol stack of a radio network is moved downward to a BS.

The present disclosure provides a Wireless/Mobile over PON/DOCSIS-based radio network transmission solution. The core of the transmission solution lies in moving downward a radio interface protocol stack of a radio network to a BS. The radio network includes WCDMA, Global System for Mobile communications (GSM), General Packet Radio Service (GPRS), Time Division-Synchronous Code Division Multiple Access (TD-SCDMA), CDMA2000, enhanced 3G and the like.

In order to move downward the radio interface protocol stack of the radio network to the BS, the existing functions of the BS in the radio network needs to be improved and a base station control processing unit needs to be configured in the BS, which are respectively described below.

In a WCDMA or GSM or GPRS or TD-SCDMA network, all processing functions of a radio network controller (RNC) or a base station controller (BSC) are moved downward into a base station control processing unit configured in the BS.

In a CDMA2000 network, all functions of the BSC and a packet control function (PCF) are moved downward into the base station control processing unit configured in the BS, or all the functions of the BSC alone are moved downward into the base station control processing unit configured in the BS.

As for an enhanced 3G network, the RAN functions are re-decomposed. A portion of the RRC and PDCP/BMC/RLC/MAC functions of an RNL protocol stack in the radio interface protocol of the network are moved downward into the base station control processing unit configured in the BS. The new functions of the BS are shown in Table 3.

TABLE 3

Comparison Table of Functional Decomposition of 3G Node B

| Function | BS Function in the Prior Art | BS Function of the Present Disclosure | Base Station Control Function of BS of the Present Disclosure |
|---|---|---|---|
| Physical Layer (PHY) | Mandatory | Mandatory | |
| Media Access Control (MAC) | | Mandatory | Mandatory |
| Radio Link Control (RLC) | | Mandatory | Mandatory |
| Broadcast/Multicast Control (BMC) | | Optional | Optional |
| Packet Data Convergence Protocol (PDCP) | | Mandatory | Mandatory |
| Radio Resource Control (RRC) | | | |
| Cell-specific Radio Resource Management (CS-RRM) | | Mandatory | Mandatory |
| Handover Control (HO Control) | | Mandatory | Mandatory |
| Admission Control | | Optional | Optional |
| Cell Control | | Optional | Optional |
| QoS Scheduling | | Optional | Optional |

In the present disclosure, as for a WiMAX network, the RAN functions in the network are re-decomposed. A base station controller unit included in the BS of the WiMAX implements a part of the functions of the ASN gateway, mainly including handover control, data path function, and radio resource management. The handover control function is directed to controlling the handover between user networks. The radio resource control and agent function is directed to the allocation and management of radio resources.

Besides the above functions, the base station controller unit may be further integrated with other functions, for example, location register, service flow authentication and management, context function, robust header compression (ROHC), key management, paging control, DHCP relay, mobile IP foreign agent (MIP FA), proxy mobile IP client (PMIP Client), and authentication relay. The functions of the base station controller unit included in the BS of the WiMAX in the present disclosure are shown in Table 4.

TABLE 4

Comparison Table of Functional Decomposition of Base Station Controller Unit of the WiMAX BS

| Function | Functions of Base Station Controller Unit of WiMAX BS of the Present Disclosure |
|---|---|
| Data Path Function | Mandatory |
| Handover Control | Mandatory |

TABLE 4-continued

Comparison Table of Functional Decomposition of Base Station Controller Unit of the WiMAX BS

| Function | Functions of Base Station Controller Unit of WiMAX BS of the Present Disclosure |
|---|---|
| Radio Resource Management | Mandatory |
| Location Register | Optional |
| Service Flow Authentication and Management | Optional |
| Context Function | Optional |
| Robust Header Compression (ROHC) | Optional |
| Key Management | Optional |
| Paging Control | Optional |
| DHCP Relay | Optional |
| Mobile IP Foreign Agent (MIP FA) | Optional |
| Proxy Mobile IP Client (PMIP Client) | Optional |
| Authentication Relay | Optional |

In Step 8-2, the BS is connected to the PON/DOCSIS network, so as to realize that the BS transmits data through the PON or DOCSIS. After the BSs of the above various radio networks have been improved, the BSs are connected to the PON or DOCSIS network, so as to realize that the BSs transmit data through the PON or DOCSIS.

A schematic view for a BS to transmit data through employing a PON is shown in FIG. 38. Referring to FIG. 38, the BS is connected to an ODN of the PON network via an ONU/ONT A schematic view for a BS to transmit data through employing a DOCSIS is shown in FIG. 39. Referring to FIG. 39, the BS is connected to an HFC/Cable Network of the DOCSIS network via a CM.

It is a better choice for a BS to transmit data through employing the PON or DOCSIS. The transmission rate of the PON or DOCSIS is much higher than that of the E1/T1. The transmission rate of the PON is listed as follows.

BPON has a transmission rate of 622 Mbps for downlink and 155 Mbps for uplink.

EPON has a transmission rate of 1.25 Gbps symmetrically for uplink and downlink.

GPON has a transmission rate of 1.25 Gbps/2.5 Gbps for downlink, and 155 Mbps/622 Mbps/1.25 Gbps/2.5 Gbps for uplink.

Generally, the maximum transmission distance of the PON can reach as long as 20 Km.

The transmission rate of the DOCSIS is shown in Table 5. Generally, the maximum transmission distance of the DOCSIS can reach as long as 5 Km.

TABLE 5

Table of DOCSIS Transmission Rate

| | DOCSIS Version 1 | DOCSIS Version 2 | DOCSIS Version 3 |
|---|---|---|---|
| Downlink Bandwidth (Mbps/Channel) | 40 | 40 | 200 |
| Downlink Bandwidth (Gbps/Node) | 5 | 5 | 6.3 |
| Uplink Bandwidth (Mbps/Channel) | 10 | 30 | 100 |
| Uplink Bandwidth (Mbps/Node) | 80 | 170 | 450 |

Through taking the PON/DOCSIS transmission technology as the transmission technology for the BS, the 3G/2G/WiMAX access network makes full use of the wire resources already allocated for the existing PON/DOCSIS network during construction, thereby reducing the construction cost of the 3G/2G/WiMAX access network.

Systems for an interconnection between a BS and a wired network according to the present disclosure are illustrated below, including two systems for the interconnection between the BS and the PON network and two systems for the interconnection between the BS and the DOCSIS network.

A structural diagram of a specific implementation of a system for an interconnection between a BS and a PON network according to an embodiment of the present disclosure is shown in FIG. 40, which includes the following modules: a BS equipment, an ONU/ONT equipment, and a remote power supply equipment.

The BS equipment is connected to the ONU/ONT equipment at a reference point a via one or more pairs of wired cables, and adapted to accomplish radio access processing of a wireless subscriber, perform a base station control processing on data packets or frames of the accessed wireless subscriber and then deliver the processed data packets or frames to the ONU/ONT equipment, and perform the base station control processing on data packets or frames delivered from the ONU/ONT equipment and then output the processed data packets or frames to the wireless subscriber. The BS equipment may be a 3G/2G/802.16 BS. The BS equipment includes base station wireless physical layer processing units, a base station controller (BSC) processing unit, base station wired interface units, and a base station remote power supply unit.

The ONU/ONT equipment is connected to the BS equipment via one or more pairs of wired cables and connected to an OLT of an OAN via one or more pairs of fibers, and adapted to convert data packets or frames delivered from the BS equipment into an optical transmission mode (for example, EPON or GPON format) and then deliver the data packets or frames in the optical transmission mode to the OLT of the OAN, and convert data packets or frames delivered from the OLT into an electrical transmission mode and then deliver the data packets or frames in the electrical transmission mode to the BS equipment. The ONU/ONT equipment includes ONU/ONT wired interface units, ONU/ONT optical transmission processing units, a switching unit, and an ONU/ONT remote power supply unit.

The remote power supply equipment is adapted to convert a mains input (for example, 110V/220V AC) or a DC input (for example, −48V/−60V DC) into a high-voltage DC output (for example, 270V DC), so as to remotely supply power to both the ONU/ONT equipment and the BS equipment or to remotely supply power to the ONU/ONT equipment alone via wired cables (for example, one or more pairs of twisted pairs). The distance of the remote power supply is relevant to the core diameter, number of pairs for the wired cables, power consumption of the outdoor unit for the BS, and output voltage of the remote power supply equipment, and generally can reach a remote power supply distance of up to 2-5 Km. The remote power supply equipment may be integrated with the BS into one equipment.

The base station wireless physical layer processing units in the BS equipment are adapted to accomplish an access of a wireless subscriber, deliver data packets or frames of the accessed wireless subscriber to the BSC processing unit, and deliver data packets or frames delivered from the BSC processing unit to the wireless subscriber. The units include one or more processing units, and each processing unit includes an antenna, a radio frequency (RF) processing module, an intermediate frequency processing module, and a base band processing module.

The BSC processing unit in the BS equipment is adapted to perform an uplink base station control processing on data packets or frames delivered from the base station wireless physical layer processing units and then deliver the processed data packets or frames to the wired interface units or transmit the processed data packets or frames back to the base station wireless physical layer processing units, and perform a downlink base station control processing on data packets or frames delivered from the wired interface units and then deliver the processed data packets or frames to the base station wireless physical layer processing units. This unit includes one or more processing units, and each processing unit is formed by a wireless data link layer processing module and a processing module of layers over the wireless data link layer. The BSC processing unit includes functions of RNC, BSC or BSC+PCF, or may include functions of the BSC of the BS shown in Table 1 or Table 2.

The base station wired interface units in the BS equipment are connected to the ONU/ONT equipment via one or more pairs of wired cables, and adapted to perform a wired interface transmission processing on data packets or frames delivered from the BSC processing unit and then deliver the processed data packets or frames to the ONU/ONT equipment, and perform a wired interface receiving processing on data packets or frames delivered from the ONU/ONT equipment and then deliver the processed data packets or frames to the BSC processing unit. The units include one or more processing units. If the system supports a Layer 3 routing, the units support processing on IP layer, data link layer, and physical layer. If the system supports a Layer 2 bridging, the units support processing on data link layer and physical layer.

The unit may be a base station Ethernet interface processing unit. In this case, the wired cables are Ethernet wired cables, the data link layer is an Ethernet MAC layer, and the physical layer is an Ethernet PHY layer.

The base station remote power supply unit in the BS equipment is adapted to convert a high-voltage DC (for example, 270V DC) from the remote power supply equipment or the remote power supply unit of the ONU/ONT equipment into a low-voltage DC, so as to locally supply power to the power supply unit of the BS equipment, or to relay the received high-voltage DC to remotely supply power to remote BS equipments in the next tier through wired cables. This unit also supports the intercommunication with the remote power supply equipment, so as to serve as an out-band management channel for the BS, thereby realizing surveillance alarm function during normal operations and system failures, which thus is convenient for equipment management, fault location, and remote maintenance.

The wired interface units in the ONU/ONT equipment are connected to the BS equipment via one or more pairs of wired cables, and adapted to perform a wired interface receiving processing on data packets or frames delivered from the BS equipment and then deliver the processed data packets or frames to the optical transmission processing units, and perform a wired interface transmission processing on data packets or frames delivered from the optical transmission processing units and then deliver the processed data packets or frames to the BS equipment. If the system supports a Layer 3 routing, the units support processing on IP layer, data link layer, and physical layer. If the system supports a Layer 2 bridging, the units support processing on data link layer and physical layer.

The unit may be an Ethernet interface processing unit. In this case, the wired cables are Ethernet wired cables, the data link layer is an Ethernet MAC layer, and the physical layer is an Ethernet PHY layer.

The optical transmission processing units in the ONU/ONT equipment are interconnected with the OLT of the OAN at the reference point (a) via one or more pairs of fibers, and adapted to convert data packets or frames delivered from the wired interface units into an optical transmission mode (for example, EPON or GPON format) and then deliver the data packets or frames in the optical transmission mode to the OLT equipment, and convert data packets or frames delivered from the OLT into an electrical transmission mode and then deliver the data packets or frames in the electrical transmission mode to the wired interface units. The units include one or more optical transmission processing units.

The switching unit in the ONU/ONT equipment is adapted to exchange data packets or frames between each wired interface unit and each optical transmission processing unit. If the system supports a Layer 3 routing, the unit is an IP switching unit. If the system supports a Layer 2 bridging, the unit is a Layer 2 switching unit. If only one optical transmission processing unit and one wired interface unit exist, the switching unit may be omitted.

The remote power supply unit in the ONU/ONT equipment is adapted to convert a high-voltage DC (for example, 270V DC) from the remote power supply equipment into a low-voltage DC, so as to locally supply power to the power supply unit of the ONU/ONT equipment, or to relay the received high-voltage DC to remotely supply power to remote ONU/ONT equipments in the next tier through wired cables, which also remotely supplies power to BS equipments through wired cables. The unit further supports the intercommunication with the BS equipment or the remote power supply equipment, so as to serve as an out-band management channel for the ONU/ONT equipment, thereby realizing surveillance alarm function during normal operations and system failures, which thus is convenient for equipment management, fault location, and remote maintenance.

A structural diagram of a specific implementation of another system for an interconnection between a BS and a PON network according to the present disclosure is shown in FIG. 41, which includes a BS equipment and a remote power supply equipment.

The BS equipment is integrated with functions of an ONU/ONT and is connected to an ODN and an OLT equipment via one or more pairs of wired cables, and adapted to accomplish radio access processing of a wireless subscriber, perform a base station control processing on data packets or frames of the accessed wireless subscriber and then deliver the processed data packets and frames to the OLT equipment, and perform the base station control processing on data packets or frames delivered from the OLT equipment and then output the processed data packets or frames to the wireless subscriber. The BS equipment may be a 3G/2G/802.16 BS. The BS equipment includes base station wireless physical layer processing units, a BSC processing unit, optical transmission processing units, and a base station remote power supply unit.

The remote power supply equipment is adapted to convert a mains input (for example, 110V/220V AC) or a DC input (for example, −48V/−60V DC) into a high-voltage DC (for example, 270V DC), so as to remotely supply power to the BS equipment through wired cables (for example, one or more pairs of twisted pairs). The distance of the remote power supply is relevant to the core diameter, number of pairs for the wired cables, power consumption of the outdoor unit for the BS, and output voltage of the remote power supply equipment, and generally reaches a remote power supply distance of up to 2-5 Km. The remote power supply equipment may be integrated with the BS into one equipment.

The base station wireless physical layer processing units in the BS equipment are adapted to accomplish an access of a wireless subscriber, deliver data packets or frames of the accessed wireless subscriber to the BSC processing unit, and deliver data packets or frames delivered from the BSC processing unit to the wireless subscriber. The units include one or more processing units, and each processing unit includes an antenna, an RF processing module, an intermediate frequency processing module, and a base band processing module.

The BSC processing unit in the BS equipment is adapted to perform an uplink base station control processing on data packets or frames delivered from the base station wireless physical layer processing units and then deliver the processed data packets or frames delivered to the optical transmission processing units or transmit the processed data packets or frames back to the base station wireless physical layer processing units, and perform a downlink base station control processing on data packets or frames delivered from the optical transmission processing units and then deliver the processed data packets or frames to the base station wireless physical layer processing units. The unit includes one or more processing units, and each processing unit is formed by a wireless data link layer processing module and a processing module of layers over the wireless data link layer. The BSC processing unit may include functions of RNC, BSC, or BSC+PCF, or may include functions of the BSC of the BS shown in Table 1 or Table 2.

The optical transmission processing units in the BS equipment are interconnected with the OLT through the ODN via one or more pairs of optical cables, and adapted to convert data packets or frames delivered from the BSC processing unit into an optical transmission mode (for example, EPON or GPON format) and then deliver the data packets or frames in the optical transmission mode to the OLT, and convert data packets or frames delivered from the OLT into an electrical transmission mode and then deliver the data packets or frames in the electrical transmission mode to the BSC processing unit. The units include one or more optical transmission processing units.

The base station remote power supply unit in the BS equipment is adapted to convert a high-voltage DC (for example, 270V DC) from the remote power supply equipment into a low-voltage DC, so as to locally supply power to the power supply unit of the BS equipment, or to relay the received high-voltage DC to remotely supply power to remote base station equipments at the next tier through wired cables. The unit further supports the intercommunication with the remote power supply equipment, so as to serve as an out-band management channel for the BS equipment, thereby realizing surveillance alarm function during normal operations and system failures, which thus is convenient for equipment management, fault location, and remote maintenance.

A structure of a system for an interconnection between a BS and a DOCSIS network according to an embodiment of the present disclosure is shown in FIG. 42, which includes a BS equipment, cable modem equipments, and a remote power supply equipment.

The BS equipment is connected to the cable modem equipments at a reference point CMCI via one or more pairs of wired cables, and adapted to accomplish radio access processing of a wireless subscriber, perform a base station control processing on data packets or frames of the accessed wireless subscriber and then deliver the processed data packets or frames to the cable modem equipments, and perform the base station control processing to data packets or frames delivered from the cable modem equipments and then output the processed data packets or frames to the wireless subscriber. The BS equipment may be a 3G/2G/WiMAX BS. The BS equipment includes base station wireless physical layer processing units, a BSC processing unit, base station wired interface units, and a base station remote power supply unit.

The cable modem equipments are connected to the BS equipment via one or more pairs of wired cables and connected to a cable modem terminal system (CMTS) equipment of the DOCSIS network via one or more pairs of coaxial cables, and adapted to perform a DOCSIS modulation on data packets or frames delivered from the BS equipment and then deliver the modulated data packets or frames to the CMTS equipment, and perform a DOCSIS demodulation on data packets or frames delivered from the CMTS equipment and then deliver the demodulated data packets or frames to the BS equipment. Each of the cable modem equipments includes a cable modem wired interface unit, a cable modem unit, and a cable modem remote power supply unit.

The remote power supply equipment is adapted to convert a mains input (for example, 110V/220V AC) or a DC input (for example, −48V/−60V DC) into a high-voltage DC (for example, 270V DC), so as to remotely supply power to both the BS equipment and the cable modem equipments or to remotely supply power to the BS equipment alone via wired cables (for example, one or more pairs of twisted pairs). The distance of the remote power supply is relevant to the core diameter, number of pairs for the wired cables, power consumption of the outdoor unit for the BS, and output voltage of the remote power supply equipment, and generally reaches a remote power supply distance of up to 2-5 Km. The remote power supply equipment may be integrated with the BS into one equipment.

The base station wireless physical layer processing units in the BS equipment are adapted to accomplish an access of a wireless subscriber, deliver data packets or frames of the accessed wireless subscriber to the BSC processing unit, and deliver data packets or frames delivered from the BSC processing unit to the wireless subscriber. The units include one or more processing units, and each processing unit includes an antenna, an RF processing module, an intermediate frequency processing module, and a base band processing module.

The BSC processing unit in the BS equipment is adapted to perform an uplink base station control processing on data packets or frames delivered from the base station wireless physical layer processing units and then deliver the processed data packets or frames to the wired interface units or deliver the processed data packets or frames back to the base station wireless physical layer processing units, and perform a downlink base station control processing on data packets or frames delivered from the wired interface units and then deliver the processed data packets or frames to the base station wireless physical layer processing units. The unit includes one or more processing units, and each processing unit is formed by a wireless data link layer processing module and a processing module of layers over the wireless data link layer. The BSC processing unit may include functions of RNC, BSC, or BSC+PCF, or may include functions of the BSC of the BS shown in Table 1 or Table 2.

The base station wired interface units in the BS equipment are connected to the cable modem equipments via one or more pairs of wired cables, and adapted to perform a wired interface transmission processing on data packets or frames delivered from the BSC processing unit and then deliver the processed data packets or frames to the cable modem equipments, and perform a wired interface receiving processing on data packets or frames delivered from the cable modem equipments and then deliver the processed data packets or frames to the BSC processing unit. If the system supports a Layer 3 routing, the units support processing on IP layer, data link layer, and physical layer. If the system supports a Layer 2 bridging, the units support processing on data link layer and physical layer.

The unit may be a base station Ethernet interface processing unit. In this case, the wired cables are Ethernet wired cables, the data link layer is an Ethernet MAC layer, and the physical layer is an Ethernet PHY layer.

The base station remote power supply unit in the BS equipment is adapted to convert a high-voltage DC (for example, 270V DC) from the remote power supply equipment or the remote power supply unit of the cable modem equipments into a low-voltage DC, so as to locally supply power to the power supply unit of the BS equipment, or to relay the received high-voltage DC to remotely supply power to remote BS equipments at the next tier through wired cables, which also remotely supplies power to the cable modem equipments via wired cables. The unit further supports the intercommunication with the remote power supply equipment, so as to serve as an out-band management channel for the BS equipment, thereby realizing surveillance alarm function during normal operations and system failures, which thus is convenient for equipment management, fault location, and remote maintenance.

The wired interface units in the cable modem equipments are connected to the BS equipment via one or more pairs of wired cables, and adapted to perform a wired interface receiving processing on data packets or frames delivered from the BS equipment and then deliver the processed data packet or frames to the cable modem units, and perform a wired interface transmission processing on data packets or frames delivered from the cable modem units and then deliver the processed data packets or frames to the BS equipment. If the system supports a Layer 3 routing, the units support processing on IP layer, data link layer, and physical layer. If the system supports a Layer 2 bridging, the units support processing on data link layer and physical layer.

The unit may be an Ethernet interface processing unit. In this case, the wired cables are Ethernet wired cables, the data link layer is an Ethernet MAC layer, and the physical layer is an Ethernet PHY layer.

The cable modem units in the cable modem equipments are interconnected with the CMTS equipment of the DOCSIS network at the reference point CMCI via one or more pairs of coaxial cables, and adapted to perform a DOCSIS modulation on data packets or frames delivered from the wired interface units and then deliver the modulated data packets or frames to the CMTS equipment of the DOCSIS network, and perform a DOCSIS demodulation on data packets or frames delivered from the CMTS equipment and then deliver the demodulated data packets or frames to the wired interface units. The units include one or more cable modem units.

The remote power supply unit in the cable modem equipment is adapted to convert a high-voltage DC (for example, 270V DC) from the remote power supply equipment or the BS equipment into a low-voltage DC, so as to locally supply power to the power supply unit of the cable modem equipment, or to relay the received high-voltage DC to remotely supply power to remote cable modem equipments in the next tier through wired cables. The unit further supports the intercommunication with the BS equipment or the remote power supply equipment, so as to serve as an out-band management channel for the cable modem equipment, thereby realizing surveillance alarm function during normal operations and system failures, which thus is convenient for equipment management, fault location, and remote maintenance.

A structure of a system for an interconnection between a BS and a DOCSIS network according to another embodiment is shown in FIG. 43, which includes a BS equipment, a CMTS equipment, and a remote power supply equipment.

The BS equipment is connected to the CMTS equipment of the DOCSIS network at a reference point CMRFI via one or more pairs of coaxial cables, and adapted to accomplish radio access processing of a wireless subscriber, and perform a base station control processing on data packets or frames of the accessed wireless subscriber and then deliver the processed data packets or frames to the CMTS equipment, and perform the base station control processing on data packets or frames delivered from the CMTS equipment and then output the processed data packets or frames to the wireless subscriber. The BS equipment may be a 3G/2G/WiMAX BS. The BS equipment includes base station wireless physical layer processing units, a BSC processing unit, base station cable modem units, and a base station remote power supply unit.

The CMTS equipment is connected to the BS equipment via one or more pairs of coaxial cables and connected to a managed IP network via one or more pairs of wired cables, and adapted to perform a DOCSIS demodulation on data packets or frames delivered from the BS equipment and then deliver the demodulated data packets or frames to the managed IP network, and perform a DOCSIS modulation on data packets or frames delivered from the managed IP network and then deliver the modulated data packets or frames to the BS equipment. The CMTS equipment includes a cable modem wired interface unit, cable modem units, and a cable modem remote power supply unit.

The remote power supply equipment is adapted to convert a mains input (for example, 110V/220V AC) or a DC input (for example, −48V/−60V DC) into a high-voltage DC (for example, 270V DC), so as to remotely supply power to both the CMTS equipment and the BS equipment or to remotely supply power to the CMTS equipment alone via wired cables (for example, one or more pairs of twisted pairs). The distance of the remote power supply is relevant to the core diameter, number of pairs for the wired cables, power consumption of the outdoor unit for the BS, and output voltage of the remote power supply equipment, and generally reaches a remote power supply distance of up to 2-5 Km. The remote power supply equipment may be integrated with the CMTS equipment into one equipment.

The base station wireless physical layer processing units in the BS equipment are adapted to accomplish a radio access of a wireless subscriber, deliver data packets or frames of the accessed wireless subscriber to the BSC processing unit, and deliver data packets or frames delivered from the BSC processing unit to the wireless subscriber. The units include one or more processing units, and each processing unit includes an antenna, an RF processing module, an intermediate frequency processing module, and a base band processing module.

The BSC processing unit in the BS equipment is adapted to perform an uplink base station control processing on data packets or frames delivered from the base station wireless physical layer processing units and then deliver the processed data packets or frames to the base station cable modem units or transmit the processed data packets or frames back to the base station wireless physical layer processing units, and perform a downlink base station control processing on data packets or frames delivered from the base station cable modem units and then deliver the processed data packets or frames to the base station wireless physical layer processing units. The unit includes one or more processing units, and each processing unit is formed by a wireless data link layer processing module and a processing module of layers over the wireless data link layer. The BSC processing unit may include functions of RNC, BSC, or BSC+PCF, or may include functions of the BSC of the BS shown in Table 1 or Table 2.

The base station cable modem units in the BS equipment are connected to the CMTS equipment of the DOCSIS network via one or more pairs of coaxial cables, and adapted to perform a DOCSIS modulation on data packets or frames delivered from the BSC processing unit and then deliver the modulated data packets or frames to the CMTS equipment, and perform a DOCSIS demodulation on data packets or frames delivered from the CMTS equipment and then deliver the demodulated data packets or frames to the BSC processing unit.

The base station remote power supply unit in the BS equipment is adapted to convert a high-voltage DC (for example, 270V DC) from the remote power supply equipment or the remote power supply unit of the CMTS equipment into a low-voltage DC, so as to locally supply power to the power supply unit of the BS equipment, or to relay the received high-voltage DC to remotely supply power to remote BS equipments in the next tier through wired cables. The unit further supports the intercommunication with the remote power supply equipment, so as to serve as an out-band management channel for the BS equipment, thereby realizing surveillance alarm function during normal operations and system failures, which thus is convenient for equipment management, fault location, and remote maintenance.

The wired interface unit in the CMTS equipment is connected to the managed IP network of the DOCSIS network via one or more pairs of wired cables, and adapted to perform a wired interface receiving processing on data packets or frames delivered from the managed IP network and then deliver the processed data packets or frames to the cable modem units, and perform a wired interface transmission processing on data packets or frames delivered from the cable modem units and then deliver the processed data packets or frames to the managed IP network. If the system supports a Layer 3 routing, the unit supports processing on IP layer, data link layer, and physical layer. If the system supports a Layer 2 bridging, the unit supports processing on data link layer and physical layer.

The cable modem units in the CMTS equipment are interconnected with the BS equipment at the reference point CMRFI via one or more pairs of coaxial cables, and adapted to perform a DOCSIS demodulation on data packets or frames delivered from the wired interface unit and then deliver the demodulated data packets or frames to the BS equipment, and perform a DOCSIS modulation on data packets or frames delivered from the BS equipment and then deliver the modulated data packets or frames to the wired interface unit. The units include one or more cable modem units.

The remote power supply unit in the CMTS equipment is adapted to convert a high-voltage DC (for example, 270V DC) from the remote power supply equipment into a low-voltage DC, so as to locally supply power to the power supply unit of the CMTS equipment, or to relay the received high-voltage DC to remotely supply power to the remote CMTS equipments in the next tier through wired cables, which further remotely supplies power to the BS equipment via wired cables. The unit further supports the intercommunication with the BS equipment or the remote power supply equipment, so as to serve as an out-band management channel for the CMTS equipment, thereby realizing surveillance alarm function during normal operations and system failures, which thus is convenient for equipment management, fault location, and remote maintenance.

The above embodiments are merely intended to demonstrate the principles of the present disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for optimizing a radio network layer to implement a network interconnection, comprising:
    configuring a wireless adapter (WA) in a base station (BS) and a radio access network server (RAN-server),
    decomposing a control function and a bearer function of a radio network controller (RNC); wherein the WA is adapted to perform bearer function of the RNC and process related radio interface protocols during communication, and the RAN-server is adapted to perform the control function of the RNC; and
    connecting the WA configured in the BS to an optical access network (OAN) via an adaptation function (AF), and connecting the RAN-server and a core network (CN) of a radio communication network to an optical line terminal (OLT), so as to implement an interconnection between an optical network and the radio communication network.

2. The method according to claim 1, wherein a radio gateway is configured in a radio access network (RAN), and the method further comprises:
    configuring the radio gateway between the BS and the CN; and
    connecting the radio gateway to the RAN-server.

3. The method according to claim 1, wherein a Layer 2 bridging technology is employed at the OAN network between the WA and the CN, and the AF, an optical network unit/optical network terminal (ONU/ONT), and an optical line terminal (OLT) are all Layer 2 network elements; or a Layer 3 routing technology is employed between the WA and the CN, and the AF, the ONU/ONT, and the OLT are all Layer 3 network elements.

4. A system for an interconnection between a BS and a wired network, comprising a BS equipment and an optical network unit/optical network terminal (ONU/ONT) equipment;
    wherein the BS equipment comprises:
    physical layer processing units, adapted to accomplish an access of a wireless subscriber, deliver data packets or frames of the accessed wireless subscriber to a base station controller (BSC) processing unit, and deliver data packets or frames delivered from the BSC processing unit to the wireless subscriber, wherein the physical layer processing units comprise at least one processing unit, and each processing unit comprises an antenna, a radio frequency (RF) processing module, an intermediate frequency processing module, and a base band processing module;
    the BSC processing unit, adapted to perform an uplink base station control processing on data packets or frames delivered from the physical layer processing units and then deliver the processed data packets or frames to base station wired interface units or transmit the processed data packets or frames back to the physical layer processing units, and perform a downlink base station control processing on data packets or frames delivered from the base station wired interface units and then deliver the processed data packets or frames to the physical layer processing units, wherein the BSC processing unit comprises at least one processing unit, and each processing unit comprises a wireless data link layer processing module or comprises a wireless data link layer processing module and a processing module of layers over the wireless data link layer; and
    the base station wired interface units, connected to the ONU/ONT equipment, and adapted to process data packets or frames from the BSC processing unit and then deliver the processed data packets or frames to the ONU/ONT equipment, and process data packets or frames from the ONU/ONT equipment and then deliver the processed data packets or frames to the BSC processing unit;
    wherein the ONU/ONT equipment comprises:
    wired interface units, connected to the BS equipment, and adapted to perform a wired interface receiving processing on data packets or frames delivered from the BS equipment and then deliver the processed data packets or frames to optical transmission processing units, and perform a wired interface transmission processing on data packets or frames delivered from the optical transmission processing units and then deliver the processed data packets or frames to the BS equipment; and
    the optical transmission processing units, interconnected with an optical line terminal (OLT) of an optical access network (OAN) at a reference point via a fiber, and adapted to convert data packets or frames delivered from the wired interface units into an optical transmission mode and then deliver the data packets or frames in the optical transmission mode to the OLT, and convert data packets or frames delivered from the OLT into an electrical transmission mode and then deliver the data packets or frames in the electrical transmission mode to the wired interface units.

5. The system according to claim 4, wherein the ONU/ONT equipment further comprises:
    a switching unit, adapted to exchange data packets or frames between each wired interface unit and each optical transmission processing unit.

6. A system for an interconnection between a BS and a wired network, comprising a BS equipment:
    wherein the BS equipment comprises:
    physical layer processing units, adapted to accomplish an access of a wireless subscriber, deliver data packets or frames of the accessed wireless subscriber to a base station controller (BSC) processing unit, and deliver data packets or frames delivered from the BSC processing unit to the wireless subscriber;
    the BSC processing unit, adapted to perform an uplink base station control processing on data packets or frames delivered from the base station wireless physical layer processing units and then deliver the processed data packets or frames to optical transmission processing units or transmit the processed data packets or frames back to the base station wireless physical layer processing units, and perform a downlink base station control processing on data packets or frames delivered from the optical transmission processing units and then deliver the processed data packets or frames to the base station wireless physical layer processing units, wherein the BSC processing unit comprises at least one processing unit, and each processing unit comprises a wireless data link layer processing module or comprises a wireless data link layer processing module and a processing module of layers over the wireless data link layer; and the optical transmission processing units, adapted to interconnect an optical distribution network (ODN) with an optical line terminal (OLT) via a fiber, and adapted to convert data packets or frames from the BSC processing unit into an optical transmission mode and then deliver the data packets or frames in the optical transmission mode to the OLT, and convert data packets or frames from the OLT into electrical signals and then deliver the electrical signals in the electrical signals to the BSC processing unit.

* * * * *